US012080163B2

(12) United States Patent
Soltesz et al.

(10) Patent No.: US 12,080,163 B2
(45) **Date of Patent: *Sep. 3, 2024**

(54) SYSTEM AND METHOD FOR PROVIDING TRAFFIC CONGESTION RELIEF USING DYNAMIC LIGHTED ROAD LANE MARKINGS

(71) Applicant: James A. Soltesz, Potomac, MD (US)

(72) Inventors: James A. Soltesz, Potomac, MD (US); John Wes Guckert, Towson, MD (US)

(73) Assignee: James A. Soltesz, Potomac, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,677

(22) Filed: Apr. 4, 2023

(65) Prior Publication Data

US 2023/0245557 A1 Aug. 3, 2023

Related U.S. Application Data

(60) Continuation of application No. 17/495,757, filed on Oct. 6, 2021, now Pat. No. 11,645,907, which is a (Continued)

(51) Int. Cl.
*G08G 1/01* (2006.01)
*E01F 9/582* (2016.01)
(Continued)

(52) U.S. Cl.
CPC ........... *G08G 1/0145* (2013.01); *E01F 9/582* (2016.02); *G08G 1/0116* (2013.01); (Continued)

(58) Field of Classification Search
CPC .................................................... G08G 1/0145
See application file for complete search history.

(56) References Cited

U.S. PATENT DOCUMENTS 6,305,874 B1 * 10/2001 Custers .................... E01F 9/669 404/9
7,021,857 B2 * 4/2006 Van Der Poel ........... E01F 9/30 404/9
(Continued)

FOREIGN PATENT DOCUMENTS

EP 1726716 A1 11/2006

OTHER PUBLICATIONS

International Search Report issued in PCT/US2017/017961; mailed Mar. 9, 2017.
(Continued)

*Primary Examiner* — Travis R Hunnings
(74) *Attorney, Agent, or Firm* — Studebaker & Brackett PC

(57) ABSTRACT

A system and method for providing increased traffic carrying capacity of a road, such as a highway, by modifying an existing roadway from, for example, four lanes to five lanes, to create an additional travel lane. The system and method dynamically changes the width of travel lanes using, for example, embedded pavement lights, or other lighting arrangements, in lieu of traditional painted lane lines. As traffic volumes increase and speeds decrease along the road, an intelligent transport system (ITS) sends a congestion signal to the overhead lane controls and dynamic message signs (DMS) along the entire road segment of interest. The posted speed limits are changed, and the lane markings are controlled to dynamically increase the number of lanes in the road segment to five, for example, of narrower widths until traffic volumes reduce and the number of lanes can be returned to four, for example, with normal speed limits.

9 Claims, 27 Drawing Sheets

Related U.S. Application Data division of application No. 16/942,584, filed on Jul. 29, 2020, now Pat. No. 11,170,641, which is a continuation of application No. 15/999,807, filed as application No. PCT/US2017/017961 on Feb. 15, 2017, now Pat. No. 10,733,878, which is a continuation of application No. 15/257,495, filed on Sep. 6, 2016, now Pat. No. 9,536,425, and a continuation-in-part of application No. 15/094,446, filed on Apr. 8, 2016, now Pat. No. 9,460,618.

(60) Provisional application No. 62/297,708, filed on Feb. 19, 2016.

(51) Int. Cl.
*G08G 1/052* (2006.01)
*G08G 1/08* (2006.01)
*G08G 1/0967* (2006.01)

(52) U.S. Cl.
CPC ........... *G08G 1/0133* (2013.01); *G08G 1/052* (2013.01); *G08G 1/08* (2013.01); *G08G 1/096716* (2013.01); *G08G 1/09675* (2013.01); *G08G 1/096783* (2013.01)

(56) References Cited

U.S. PATENT DOCUMENTS 7,025,525 B2 4/2006 Van Der Poel
7,137,754 B2 * 11/2006 Van Der Poel ......... E01F 9/582 362/153.1
7,147,400 B2 * 12/2006 Van Der Poel ........... E01F 9/20 362/153.1
7,234,892 B2 * 6/2007 Raaijmakers ........... E01F 9/582 404/9
7,708,493 B2 5/2010 Jung et al.
7,739,030 B2 6/2010 Desai et al.
9,460,618 B1 * 10/2016 Soltesz ................ G08G 1/0145
9,536,425 B1 * 1/2017 Soltesz ............ G08G 1/096716
10,048,688 B2 * 8/2018 Ramasamy ........... B60W 40/06
10,637,683 B2 * 4/2020 Funk .................. G01C 21/3415
10,733,878 B2 8/2020 Soltesz et al.
11,170,641 B2 11/2021 Soltesz et al.
11,645,907 B2 * 5/2023 Soltesz ............ G08G 1/096783 340/907
2004/0091313 A1 * 5/2004 Zhou ....................... E01C 1/002 404/1
2006/0267795 A1 * 11/2006 Draaijer ................... G08G 1/04 340/907
2007/0048084 A1 * 3/2007 Jung ....................... H04L 67/52 404/9
2008/0216367 A1 * 9/2008 Van Der Poel ........... E01F 9/30 40/541
2009/0125160 A1 * 5/2009 Desai ...................... E01C 1/002 701/1
2009/0256723 A1 * 10/2009 Peddie ............ G08G 1/096783 340/907
2013/0009569 A1 * 1/2013 Knibbe .................. H05B 47/19 315/297
2018/0165954 A1 * 6/2018 Song ...................... G08G 1/056
2021/0043075 A1 * 2/2021 Kourous-Harrigan ....................... G08G 1/0145

OTHER PUBLICATIONS

Highway Safety Information System, "Safety Effects of Using Narrow Lanes and Shoulder-Use Lanes to Increase the Capacity of Urban Freeways", Journal of the Transportation Research Board No. 1897; dated 2004.
"Dynamic road marking" by Keith Henry et al.; EE Publisher; Mar. 3, 2005.
"The variable asignment of roads and public spaces" By Jacques Nouvier, CERTU; Ecomm 2004; XP-2361036.
European Extended Search Report & Search Opinion issued in the European Patent Application 17753753.7; mailed Nov. 29, 2019.

* cited by examiner

SYSTEM AND METHOD FOR PROVIDING TRAFFIC CONGESTION RELIEF USING DYNAMIC LIGHTED ROAD LANE MARKINGS

CROSS-REFERENCE TO RELATED APPLICATIONS

This application is a continuation of U.S. patent application Ser. No. 17/495,757, filed Oct. 6, 2021, which is a divisional of U.S. patent application Ser. No. 16/942,584, filed on Jul. 29, 2020, now issued as U.S. Pat. No. 11,170,641, which is a continuation of U.S. patent application Ser. No. 15/999,807, filed Aug. 20, 2018, now issued as U.S. Pat. No. 10,733,878, which is the U.S. National Stage of International Application No. PCT/US2017/017961, filed Feb. 15, 2017, which is a continuation of U.S. patent application Ser. No. 15/257,495, filed Sep. 6, 2016, now issued as U.S. Pat. No. 9,536,425, which is a continuation-in-part of U.S. patent application Ser. No. 15/094,446, filed on Apr. 8, 2016, now issued as U.S. Pat. No. 9,460,618, which claims priority to U.S. Provisional Application No. 62/297,708, filed on Feb. 19, 2016, the entire contents of U.S. patent application Ser. No. 17/495,757, U.S. patent application Ser. No. 16/942,584, U.S. patent application Ser. No. 15/999,807, U.S. patent application Ser. No. 15/257,495, U.S. patent application Ser. No. 15/094,446, and U.S. Provisional Application No. 62/297,708 being incorporated by reference herein.

BACKGROUND

Field of the Invention

The present invention generally relates to a system and method for providing traffic congestion relief. More particularly, the present invention relates to a system and method for providing traffic congestion relief by receiving data from traffic and speed sensing monitors and, based on that data, operating a lighted lane markings, such as LED in-pavement lane markings, to change the widths and number of the traffic lanes, thus maximizing the number of lanes based on congestion and speed of the vehicles and increasing road traffic carrying capacity.

Background Information

Federal and state highway design manuals incorporate standards which provide operational road maximization based on optimal driving conditions. For example, road geometrics are utilized based on maximum design speeds. Because these geometrics are static, the geometrics cannot change or adapt regardless of the real time operations of traffic on a road. Therefore, when the designed vehicle travel speeds are achievable, the roads function in acceptable fashion with specified design standards and geometrics. However, at other times when the designed vehicle travel speeds are not achievable due to, for example, congestion caused by over capacity of the traditional road design parameters, the road functions in a much less efficient manner Hence, traffic jams, congestion, slower commuting travel, increased air pollution due to stop and go traffic, traffic speeds less than the designed vehicle travel speeds, and other undesirable circumstances occur.

Examples of guidelines for these type of lane configurations are set forth by the American Association of State Highway and Transportation Officials (AASHTO). For example, in urban areas where pedestrian crossings, right-of-way, or existing development place stringent controls on lane widths, the use of 3.3-m (11-ft) lanes may be appropriate. Lanes that are 3.0 m (10 ft) wide are also acceptable on low-speed facilities, and lanes 2.7 m (9 ft) wide may be appropriate on low-volume roads in rural and residential areas. Further information is available in the NCHRP Report 362, Roadway Widths for Low-Traffic Volume Roads (45). In some instances, on multilane facilities in urban areas, narrower inside lanes may be utilized to permit wider outside lanes for bicycle use.

Thus, traditional roads either serve a single purpose of a higher speed highways or at lower speed urban arterial, but not both. Typically, neither type of road can effectively adapt to changes in traffic volume and so on, which can often change several times during a typical day. Roadways in urban areas are designed with different standards based on the objectives of the proposed highway operations, and transportation public agencies often stipulate specified design standards of the proposed road segments. Once constructed, either the highway or the arterial will incorporate geometrics to address the proposed operational standards, thereby forgoing any geometric flexibility to adapt the road to changing needs, such as changes in traffic volume and so on.

With conventional road geometrics, it is very common for roadway operations to change during certain times of the day due to non-controllable events such as high commuter volumes experienced during peak rush hours, inclement weather conditions, or highway incidents. During these times, optimization of traffic carrying capacity is generally not achievable on conventional roads, mainly because road geometrics remain static based on the designed speed standards. For example, highway design speeds in the 50 to 60 mph range commonly mandate lane widths of 12 feet. However, urban arterial roads with higher volumes of traffic can and should operate with narrower lanes, such as 10 feet wide lanes. The narrower lanes are permissible for vehicles to operate safely and efficiently at speeds of 40 miles or less. Also, the 10 feet wide lanes may actually encourage maintaining the lower speeds in urban congestion areas, as is apparent based on studies throughout the country. Nevertheless, because the road geometrics on these conventional roads are static, the geometrics remain unchanged even if different geometrics would be appropriate to accommodate different traffic conditions.

Accordingly, in view of the above shortcomings, a need exists for an improved system and method for providing traffic congestion relief.

SUMMARY

One aspect of the present invention provides a system and method for providing increased traffic carrying capacity of a road, such as a highway. The system and method operates to reduce traffic congestion and increase driving safety by modifying an existing roadway from, for example, four lanes to five lanes to create an additional travel lane. In particular, the system and method dynamically changes the widths and number of travel lanes using dynamic indicators, such as LED embedded pavement lights in the road surface or other types of lighting arrangements, in lieu of traditional painted lane lines. The system and method utilize, for example, functionality of an intelligent transportation system (ITS). As traffic volumes increase and speeds decrease along the road, the ITS sends a signal, such as a wireless signal, to the overhead lane controls and dynamic message signs (DMS) along the entire segment of the road of interest. The system and method send signals to change the posted speed limits and the LED in-pavement lane markings to dynamically increase the number of lanes in the road segment such that the road segment has more lanes (e.g., 5 lanes instead of 4) of narrower widths (e.g., approximately 10 feet wide each instead of the standard 12 feet wide lanes). The system and method maintain the increased number of lanes until traffic volumes reduce and vehicle are capable of operating using the original number of lanes of standard lane width dimensions. The system and method thus controls the lane markings in the road segment to transition back to the original four-lane configuration with normal speed limits.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the disclosed embodiments are provided for illustration only and not for the purpose of limiting the invention as defined by the appended claims and their equivalents.

Figure 1:
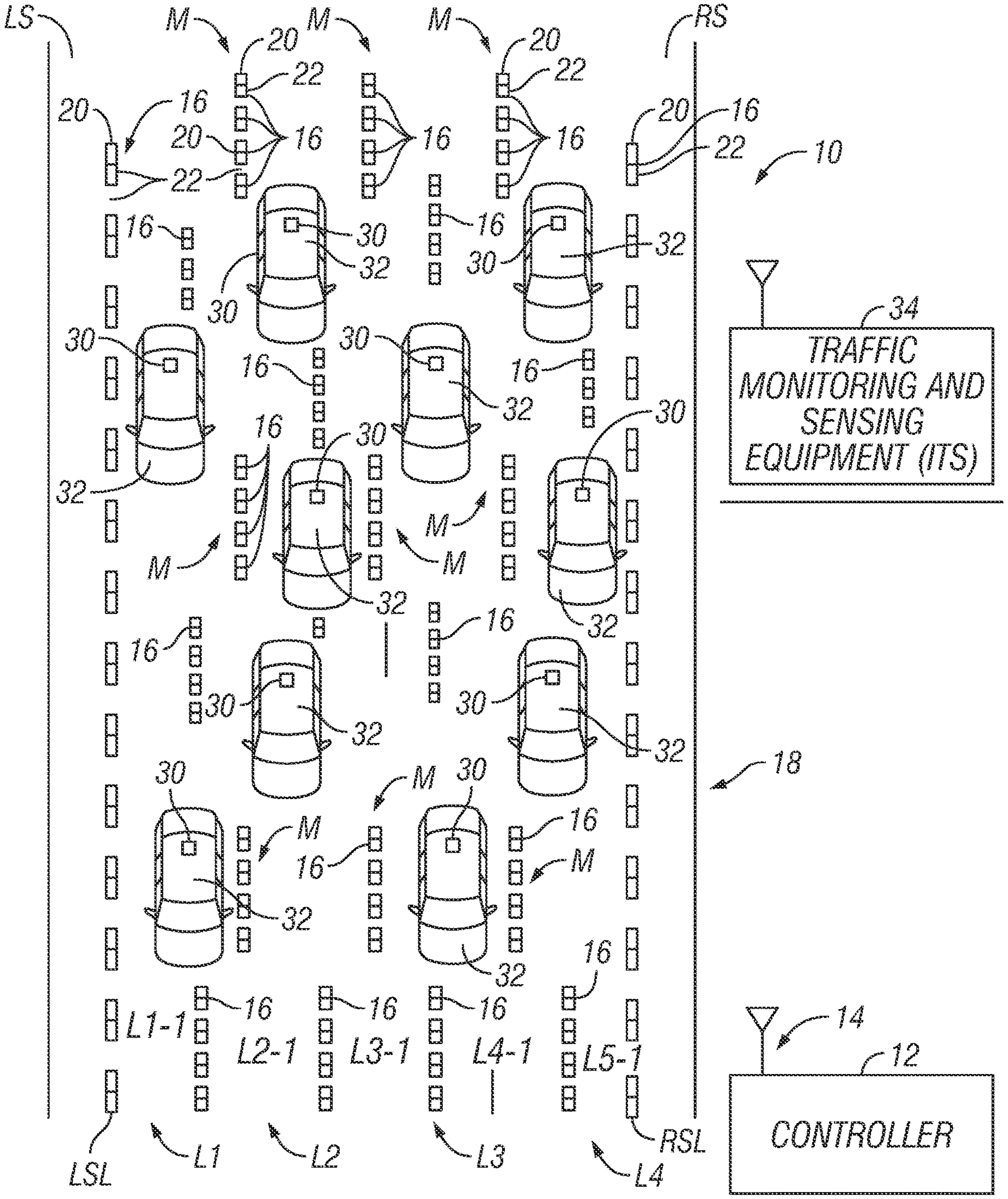
FIG. 1 is a block diagram illustrating an example of a system for providing traffic congestion relief using dynamic lighted road lane markings according to a disclosed embodiment.

FIG. 1 illustrates an example of a system and method for providing traffic congestion relief 10 (known as "Smart-Road") according to a disclosed embodiment. As shown, the system 10 includes one or more controllers 12. Each controller 12 includes at least one communication device 14, such as a wireless communication device or wired communication device, for communicating information to and from external sources. For example, the communication device 14 enables the controller 12 to communicate with dynamic indicators 16 associated with a road segment 18, such as a portion of a highway or any type of road that permits vehicular traffic. As discussed herein, the dynamic indicators 16 are grouped or configured to represent lane makers (e.g., dashes) M as would typically be represented by painted markers on a conventional road segment. As with standard painted lane markers, each lane marker M has a length of 10 feet, and the lane markers M are separated from each other by 30 feet. Naturally, the length of each lane marker M and the separation between adjacent lane markers M can be any suitable value as understood in the art. Also, the dynamic indicators 16 are positioned to represent the left shoulder line LSL and right shoulder line RSL as would also typically be represented by paint on a conventional road segment. Each dynamic indicator 16 in this example can include a communication device 20 for communicating with, for example, the communication device 12 of the controller 10 or any other external communication devices wirelessly or in a wired manner as understood in the art. Each communication device 20 can include a processor or type of controller for controlling operation of the dynamic indicator 16 as discussed herein and as understood in the art. Also, in certain geometric situations including sharp curves, dynamic indicators 16 placed close to each other, such as 3 feet apart, can be utilized as appropriate.

The communication device 20 can also communicate with other communication devices 20 in other dynamic indicators 16 such that the dynamic indicators 16 can communicate with each other. Each dynamic indicator 16 in this example further includes an indicator device 22. An indictor device 22 can be a lighting device, such as LED lights, fiber optic strips, light pipes, shifting colored plates, and so on, that is, for example, embedded into the surface of the road segment 18, or fixed to or associated with the road 18 in any suitable manner as discussed herein and understood in the art.

The indicator device 22 also can be any of the other type of active or passive indicator devices discussed herein, or a combination of such indicator devices. For instance, an indicator device 22 can be a surface of a dynamic indicator 16 that is illuminated by a lighting device, such as a laser, that is positioned above the road segment 18 or at any other appropriate location. An indicator device 22 can be an imprinted or painted surface that is activated or illuminated by a lighting device or energy emitting device positioned above the road segment 18 or at any other appropriate location. Also, in a smart vehicle technology application, an indicator device 22 can include an interface that provides an invisible track along which a smart vehicle (e.g., a "driverless vehicle") is controlled to travel, thus creating a virtual lane for the vehicle. Naturally, any indicator device 22 can include a combination of these types of technologies as desired. Furthermore, each dynamic indicator 16 can illuminate a certain color. For example, the dynamic indicators 16 positioned as lane markers M can illuminate white, or a different color such as yellow or amber. Likewise, dynamic indicators 16 positioned to represent the left shoulder line LSL and right shoulder line RSL can illuminate white, or a different color such as yellow or amber. In this example, the left shoulder lane LSL illuminates in yellow or amber, in particular. Other dynamic indicators 16 positioned as the taper lines discussed below can illuminate white, or any other suitable color such as yellow or amber.

Figure 2:
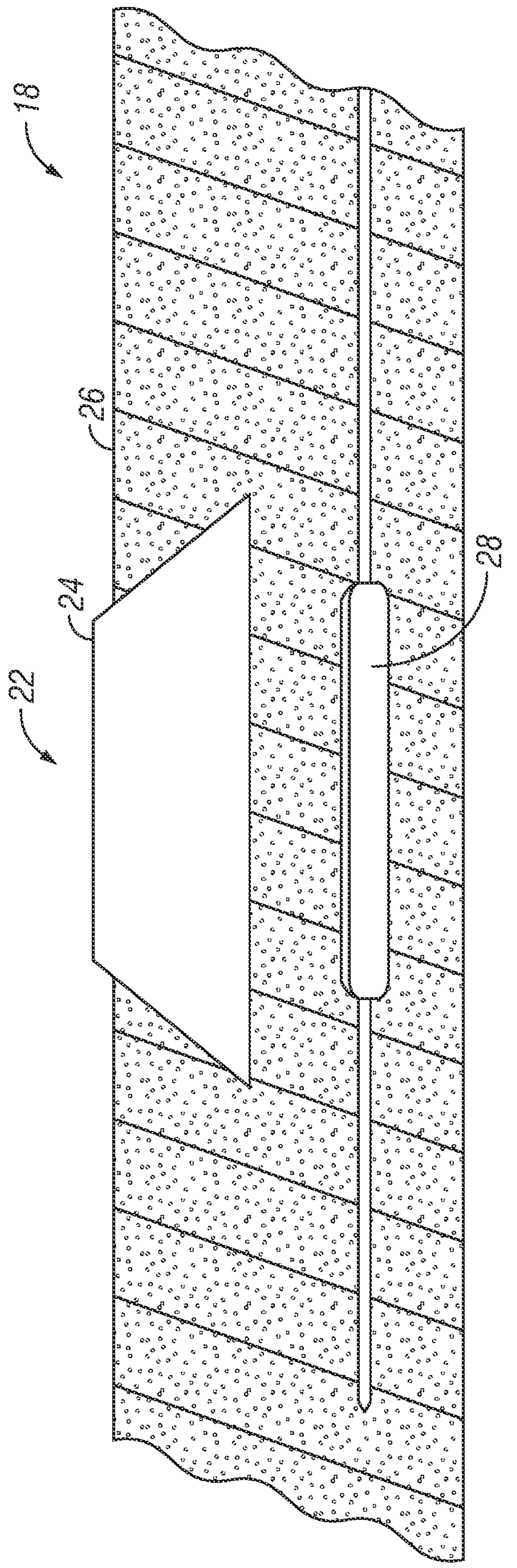
FIG. 2 is a cross-sectional view of a road segment illustrating an example of a lighting device, such as an LED device, that is embedded in the road segment and operates as a dynamic lighted road lane marking employed in the system shown in FIG. 1.

As can be appreciated from the description herein, the dynamic indicators 16 can include embedded durable LED lights, such as the LED light 24 shown in FIG. 2, as the indicator devices 22. Each LED light 24 in this example is embedded in the surface 26 of the road segment 18. As discussed herein, these LED lights 24 replace the traditional painted white lines or any other types of traditional fixed or movable types of barriers, such as cones, pylons and so on. The LED lights 24 are very durable, self-cleaning, and have been approved for use throughout the world for traffic related applications.

The dynamic indicators 16, such as those including the LED lights 24, in this example can also include illumination controls which will automatically adjust based on the time of the day and during inclement weather conditions. The LED in embedded pavement lights can in this example be clearly visible during bright sunlight, but will not be overwhelming for night time driving. The brightness will be controlled automatically through the technology operational sensor system of the system 10 as understood in the art.

The LED lights 24 are embedded slightly above the elevation of the surface 26 of the pavement of the road section 18 to allow for normal plowing operations. The LED lights 24 have a design life of over 10 years, therefore maintenance is minimal. A non-connected energy source, such as an inductive power transfer source 28, can be used to power the LED lights 24. Thus, there need not be direct wire connections to the LED lights 24, which are typically the cause of maintenance issues due to corrosion. However, the dynamic indicators 16, such as those including the LEDs lights 24 as the indicator devices 22, can be powered in any other suitable manner, including wired power, solar power, and so on. Moreover, since the LED lights 24 can be one-way directional, the emitted light will not interfere with opposing traffic motorist. The in-pavement LED lights 24 could be installed using a coring drill device or any other suitable equipment as understood in the art. Also, power cabling for operation of the in-pavement LED markings can be saw cut into the pavement and sealed with high-strength epoxy, or in any other suitable manner, followed up with an asphalt topping coat or other pavement type to complete the installation.

As further shown in FIG. 1, the communication device 14 associated with the controller 12 also enables the controller 12 to communicate with any suitable type of communication device 30 on vehicles 32, to exchange information between the controller 12 and the vehicles 32. Furthermore, the communication devices 20 of the dynamic indicators 16 can communicate with the communication devices 30 on the vehicles 32 as understood in the art. For instance, the controller 12 and the dynamic indicators 16 can communicate with GPS devices, mapping devices and other devices on the vehicles 32 so that the GPS and mapping devices can display a representation of the virtual lanes created by the dynamic indicators 16 along the road segment 18. Also, by linking the controller 12 to databases such as weather radar, the roadway can make adjustments to the road geometrics in a manner described below during inclement weather thereby slowing speeds on the road, adding an additional travel lane and minimizing the potential for accidents. Thus, the system 10 could follow a storm and make real time adjustments to the roadway in order to increase capacity, but also slow down speeds in a manner described below. The system 10 can also control the dynamic indicators 16 as described below to change the road configuration due to special conditions or events, even in cases of national emergency.

As discussed in more detail below, the controller 12 includes hardware and software for controlling the system 10, and can also allow a form manual control of at least some of the features of the system 10. The controller 12 preferably includes a microcomputer with a control program that controls components of the system 10, such as the communication device 14, dynamic indicators 16 and other components as discussed herein. The controller 12 includes other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the controller 12 can be any combination of hardware and software that will carry out the functions of the present invention. Also, a processor of a communication device 20 of each a dynamic indicator 16 can include similar features for controlling the communication device 20 and operating the dynamic indicator 16. Furthermore, the controller 12 can communicate with the other components of the system 10 discussed herein in any suitable manner as understood in the art. In addition, the controller 12 can employ software monitoring to detect any malfunctions of, for example, the in-pavement LED lights 24, the overhead gantry signs 40 and so on. Hence, monitoring and maintenance operations can be constantly monitored, and maintenance messages can be sent automatically to the road operations center by the controller 12. The controller 12 can also provide real-time information on energy usage due associated with the in-pavement LED lights 24 and so on.

That is, the controller 12 communicates with traffic monitoring and sensing equipment 34 as known in the art, such as an intelligent transportation system (ITS) as discussed above, which detects vehicle speeds on the road segment 18, such as slower vehicle speeds. Each unit of the traffic and monitoring sensing equipment 34 can be positioned at certain distances along the road segment 18, such as every half mile or at any other suitable distances. The traffic monitoring and sensing equipment 34 typically operates 24 hours a day, 7 days a week. The traffic monitoring and sensing equipment 34 also can include equipment as known in the art for monitoring, for example, weather conditions or other conditions affecting the road segment 18. Naturally, such weather monitoring equipment and other monitoring equipment can be disposed at any suitable locations with respect to the road segment 18, and can communicate directly with the controller 12, the dynamic indicators 16, the vehicles 32 and so on. Thus, the traffic monitoring and sensing equipment 34 includes a communication device 36 that communicates information pertaining to such vehicle speeds to the controller 12 wirelessly or in a wired manner as understood in the art. The traffic monitoring and sensing equipment 34 is also capable of communicating via the communication device with the dynamic indicators 16, the vehicles 32 and any other external devices as understood in the art and described herein. For instance, the traffic monitoring and sensing equipment 34 can communicate with overhead gantry signage signal 40 as discussed herein. The overhead gantry signs 40 can be programmable and have, for example, a life cycle of 10 years or more.

Examples of functionality of the system 10 will now be described. Although the examples below mainly discuss the use of LED lights 24 as the types of indicator devices 22, any configuration of the indicator devices 22 as discussed herein (e.g., laser activated, smart vehicle technology and so on) can be used in the examples described herein. The system 10 thus allows for road segments 18 to change and adapt to different traffic volume needs of a road as necessary for purposes of optimizing traffic capacity. The road segment 18 can change its geometrics as needed in real time to provide duel service of a higher speed highway versus an urban arterial. Thus, the system 10 is operable to increase, in a safe and environmentally sensitive approach, traffic capacity in traditional roads. Also, in a smart vehicle technology application, the dynamic indicators 16 provide an invisible track along which a smart vehicle (e.g., a "driverless vehicle") is controlled to travel.

FIGS. 3 through 8 illustrate a road segment 18 employing features of the system 10 as discussed above. The road segment 18 can be, for example, a portion of a highway that commonly experiences congestion during morning and evening commuting times. For instance, a road segment 18 can be a segment of I-270 near Washington, DC that commonly experiences congestion during morning and evening commuting times. The road segment 18 can be several miles long, such as 10 miles or any suitable length as is necessary for the road at issue. Also, prior to and after the road segment 18, the road markers and shoulder lines are represented by conventional painted lines.

Figure 3:
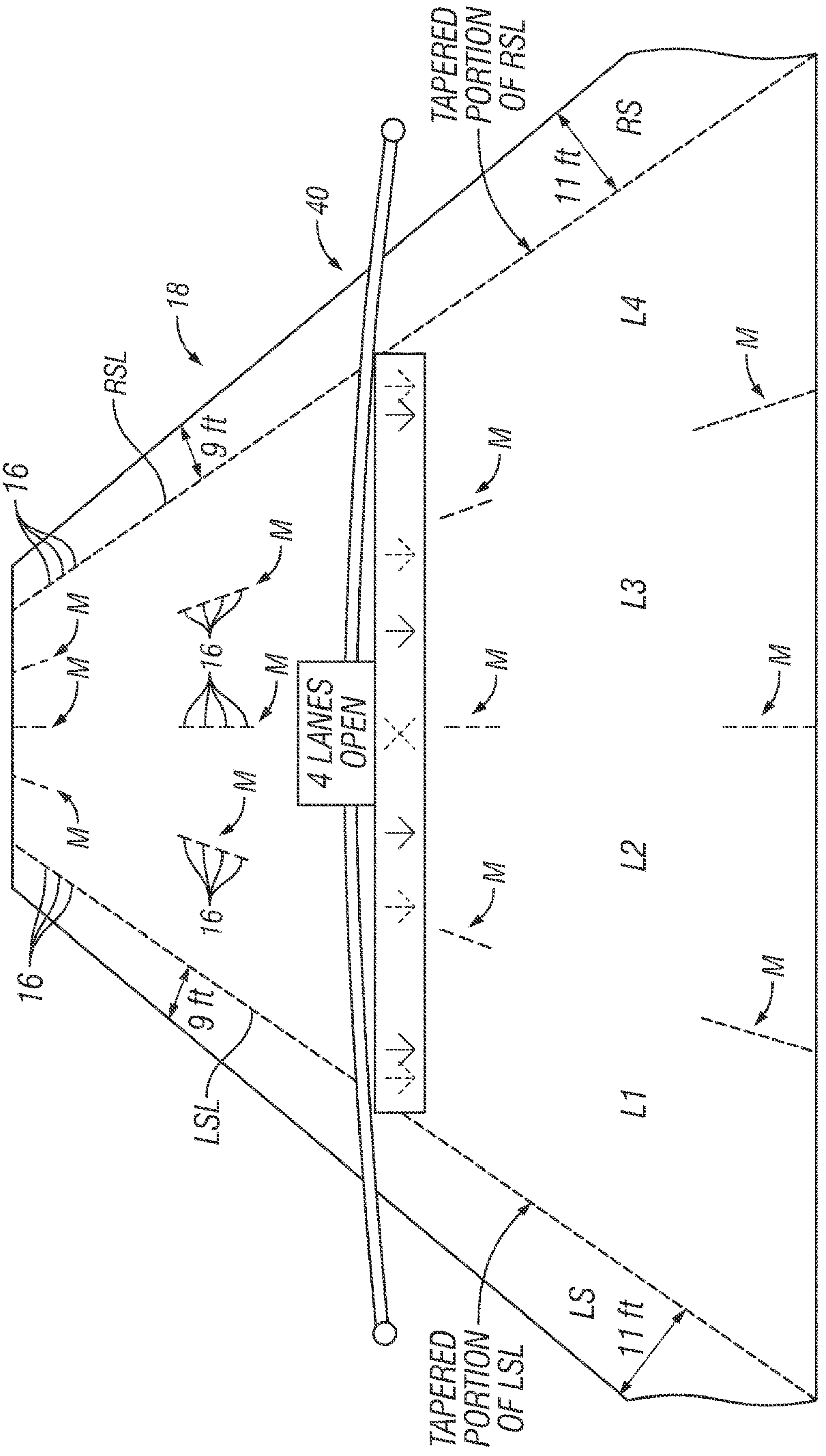
FIG. 3 is a diagrammatic view illustrating an example of a road segment being controlled by the system shown in FIG. 1 to illuminate four road lanes of the road segment under normal traffic conditions.

As discussed above, the controller 12 receives information from the traffic monitoring and sensing equipment 34 (e.g., the ITS) pertaining to monitored vehicle speeds, monitored traffic volume and so on. As indicated in FIG. 3, during normal vehicle traffic conditions in the road segment 18, the controller 12 controls the dynamic indicators 16 to illuminate markers M to represent four lanes L1, L2, L3 and L4 as would be represented on a typical four lane highway by painted markings. The dynamic indicators 16 begin where the conventional painted lines end along the road at the beginning of the road segment 18, and extend throughout the entire road segment 18 as will now be described.

For example, each of the four lanes L1 through L4 of a standard highway having painted markers has a standard width of 12 feet, and each of the left and right shoulders LS and RS of a standard highway having standard painted shoulder lines have a standard width of 11 feet. In this exemplary configuration, the beginning of the road segment 18 begins at the point on the road where the painted shoulder lines and the painted markers end. Thus, at the beginning of the road segment 18, the dynamic indicators 16 are positioned to represent the lane markers M (e.g., white dashes), the left shoulder line LSL and the right shoulder line RSL. As with standard painted lane markers, each lane marker (dash) M has a length of 10 feet, and the lane markers (dashes) Ms are separated from each other by 30 feet intervals. Also, the dynamic indicators 16 identify the left shoulder line LSL of the left shoulder LS and the right shoulder line RSL of the right shoulder RS of the road segment 18.

Furthermore, at the beginning of the road segment 18, the dynamic indicators 16 are positioned along the portion of the road segment to provide a 140 feet long taper of the left shoulder line LSL and the right shoulder line RSL to decrease the width of the left shoulder LS and the width of the right shoulder RS from 11 feet to 9 feet. This causes the width of the leftmost lane L1 and the width of the rightmost lane L4 to increase to 14 feet each. Thus, during normal non-peak traffic times, the dynamic indicators 16 making up the left shoulder line LSL, the right shoulder line RSL and the markers M outline the leftmost lane L1 having a width of 14 feet wide, the two middle lanes L2 and L3 each having a width of 12 feet, and the rightmost lane L4 having a width of 14 feet as shown in FIG. 3. This arrangement of the wider leftmost lane L1 and rightmost lane R1 decreases the likelihood that vehicles 32 transitioning from the four lane configuration to the five lane configuration discussed below will overrun dynamic indicators 16 making up the markers M between the lanes. Naturally, the tapered portion of the road segment 18 need not extend for 140 feet along a portion of the road segment 18, but can be any suitable length. Also, the tapered portion of the road segment 18 need not begin exactly where the conventional painted lines on the road segment 18 end, but rather, the dynamic indicators 16 may be positioned for a short distance after the painted lines end without tapering the left shoulder line LSL and the right shoulder line RSL, and then the tapered portions of the left shoulder line LSL and the right shoulder line RSL can begin. Moreover, the widths of the left shoulder LS and right shoulder RS can be decreased to any suitable value in a manner consistent with the description herein.

The ITS or the controller 12 also controls the overhead gantry sign 40 to indicate that all four lanes L1 through L4 are open and speed is normal (e.g., 65 mph). Therefore, while the controller 12 receives information from the traffic monitoring and sensing equipment 34 indicating that travel conditions are normal (e.g., no congestion conditions exist), the controller 12 continues to control the dynamic indicators 16 to represent the four lanes L1 through L4, the left shoulder line LSL and the right shoulder line RSL as shown in FIG. 3 for the entire road segment 18. In addition, the controller 12, the ITS or both can wirelessly communicate information pertaining to the road lane configuration to the communication devices 30 on the vehicles 32 so that the vehicles 32 can, for example, provide this information to their drivers via visual and/or audio representations, such as on a GPS map display, via audible warnings and so on.

Figure 4:
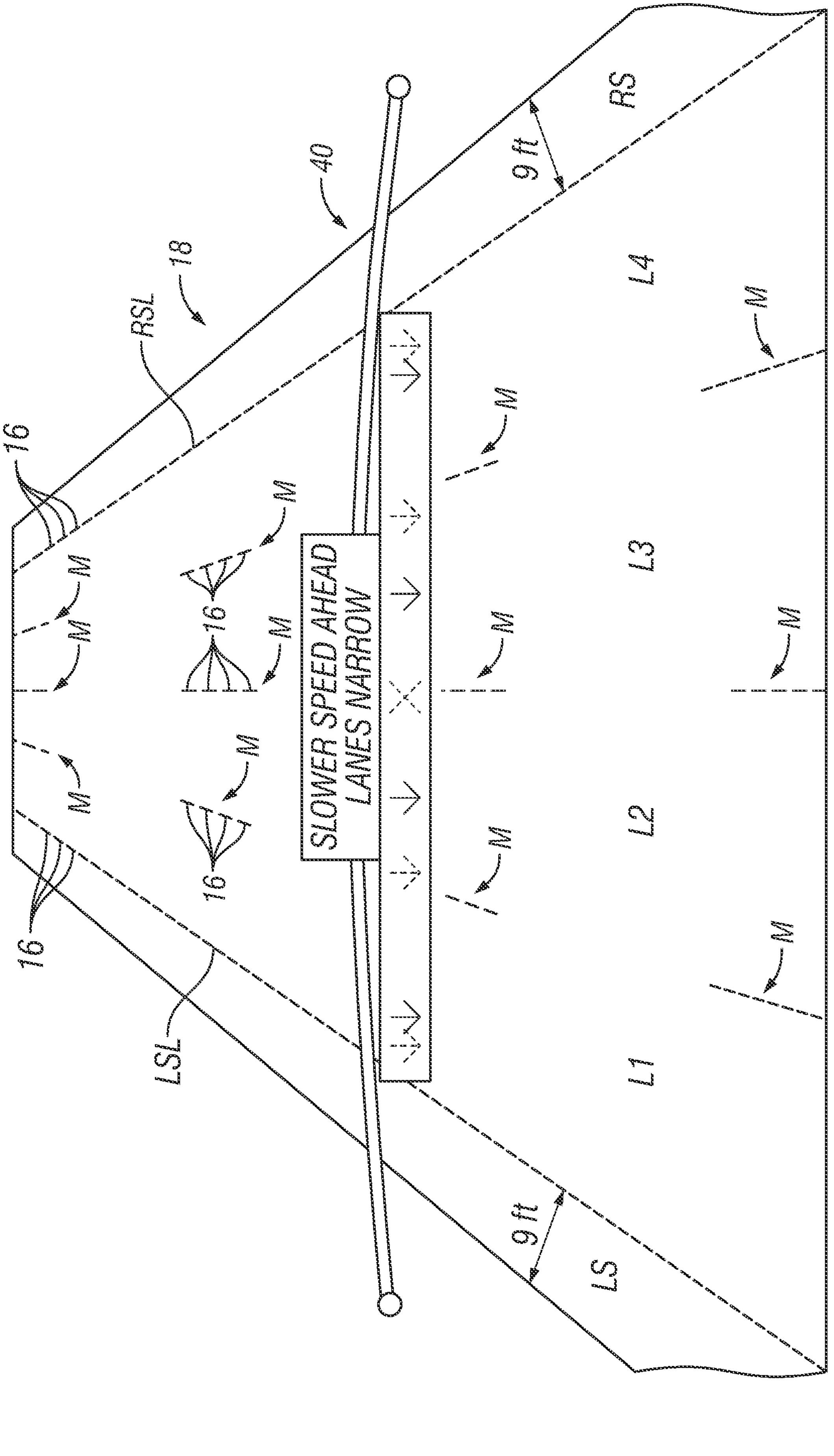
FIG. 4 is a diagrammatic view illustrating an example of a road segment being controlled by the system shown in FIG. 1 to illuminate four road lanes of the road segment in advance of a congested area.

When the traffic monitoring and sensing equipment 34 determines that, for example, the traffic pattern on the road segment 18 indicates that there is congestion in the road segment 18, the controller 12 receives information from the traffic monitoring and sensing equipment 34 indicating that a congestion condition is being detected. Thus, as shown in FIG. 4, the ITS or the controller 12 can control the overhead gantry sign 40 to indicate to motorist that there is congestion ahead and that the lane configuration will be changing. The initial signage information can appear on overhead gantry signs 40 upstream of the congestion area of the road segment 18 by approximately 2 miles, for example, or any suitable distance. As with a conventional highway, overhead gantry signs 40 are positioned along the road segment 18 at certain distances, such as every 1,100 feet apart or at any suitable spacing.

As the motorist continues to travels closer to the congestion area, the overhead gantry sign 40 along the road segment 18 at a location closer to the congested area will inform the motorist to follow the illuminated dynamic indicators 16. The overhead gantry signs 40 also provide an indication to inform the driver that the lanes on the road segment 18 will narrow and speeds will decrease (e.g., to 45 mph or any appropriate speed as understood in the art). This provides the motorist adequate time to adjust driving patterns before entering the congested area. Such information, along with the increased awareness of the different lane patterns provided by the dynamic indicators 16, improve operating safety of the vehicles 32 in the congested area along the road segment 18.

Figure 5:
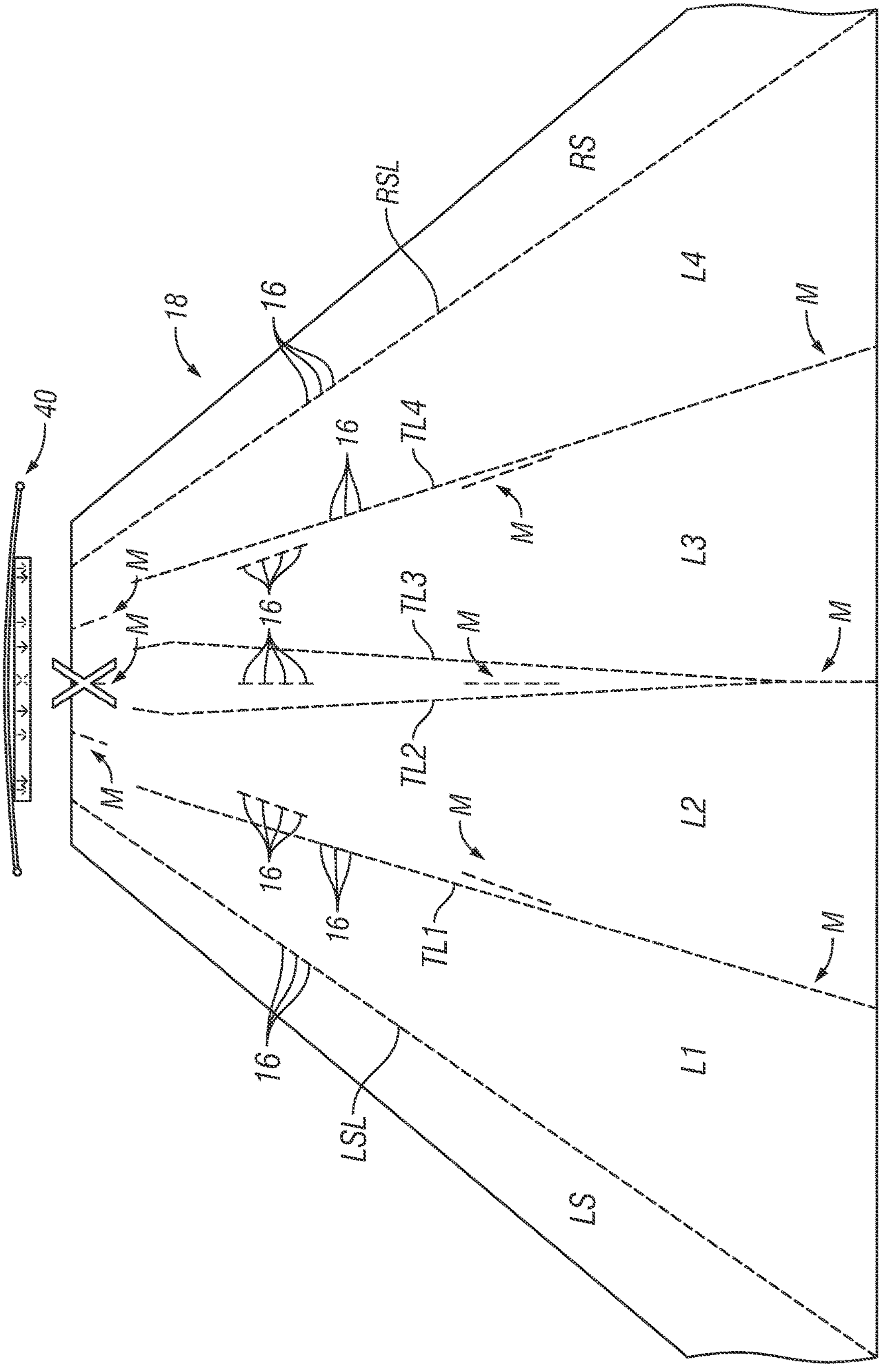
FIG. 5 is a diagrammatic view illustrating an example of a transition between four lanes to five lanes in the road segment.
Figure 6:
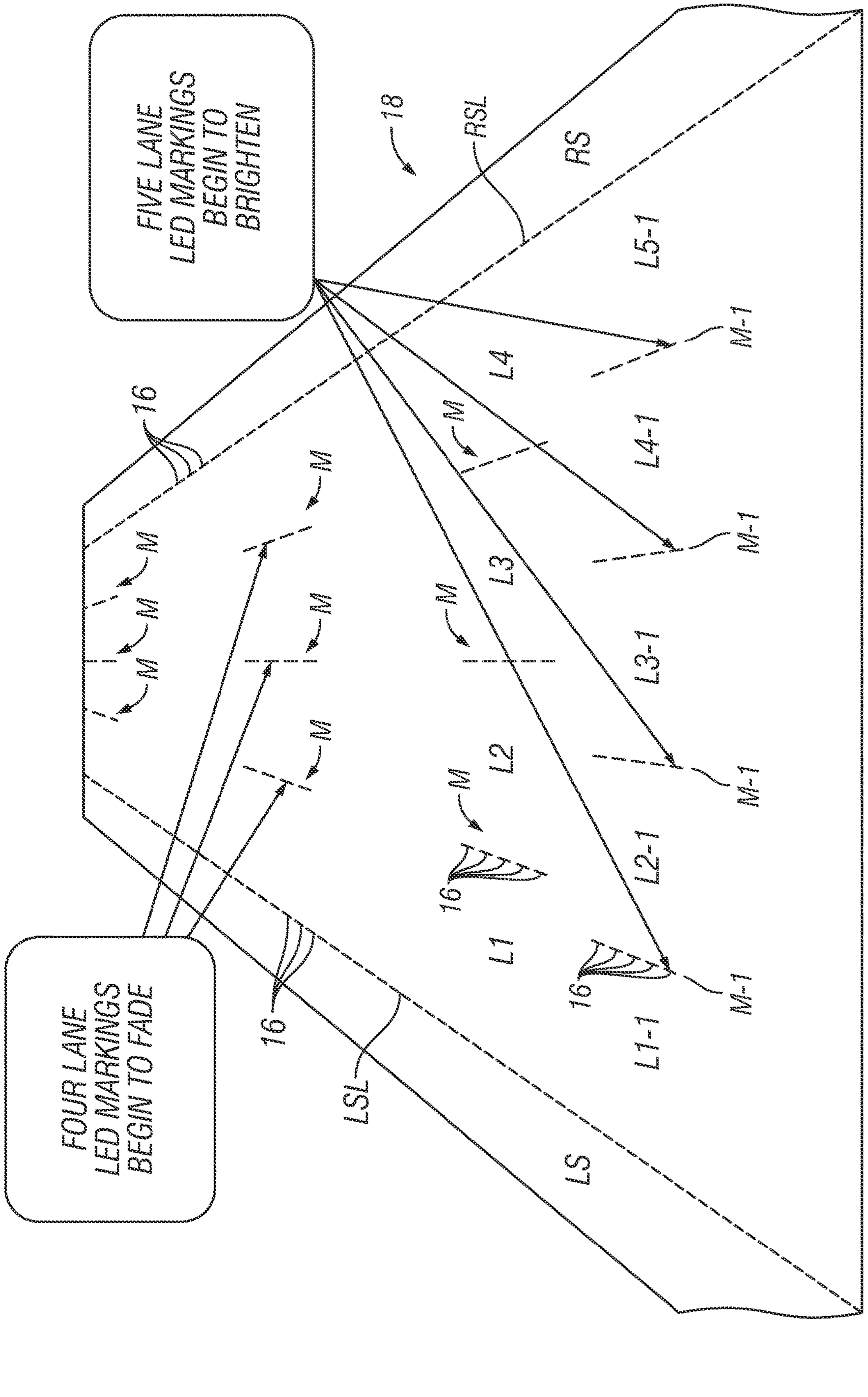
FIG. 6 is a diagrammatic view further illustrating an example of a transition between four lanes to five lanes in the road segment.

As shown in FIG. 5, the dynamic indicators 16 are positioned along a portion of the road segment 18 to provide a taper which directs drivers of the vehicles 32 toward the lanes of the new lane pattern. In this example, dynamic indicators 16 are positioned to create taper lines TL1, TL2, TL3 and TL4 which provide an illuminated path for the drivers of the vehicles 32 toward the lanes of the five lane road pattern which is shown in FIG. 6. The taper lines TL1 through TL4 can illuminate in any suitable color, such as white, yellow or amber. In this example, the middle taper lines TL2 and TL3, in particular, illuminate in yellow or amber. Also in this example, taper lines TL1, TL2, TL3 and TL4 begin at the end of the 140 feet long tapered section of the left shoulder line LSL and the right shoulder line RSL and extend for 500 feet along the road segment 18 to transition the four lanes L1 through L4 into five lanes L1-1 through L1-5.

As further shown in FIG. 6, during, shortly after and/or shortly before the portion of the road segment 18 at which the taper lines TL1, TL2, TL3 and TL4 are present, the controller 12 can control the dynamic indicators 16 representing the lane markers M for the four lanes to fade in illumination while the controller controls the dynamic indicators representing the lane markers M-1 for the five lanes to increase in intensity. Naturally, the taper lines TL1, TL2, TL3 and TL4 need not extend for 500 feet along the road segment 18, but can extend for any suitable length in a manner consistent with the description herein. Also, the taper lines TL1, TL2, TL3 and TL4 need not begin at the end of the 140 feet long tapered segment, but can begin at a location within the 140 feet long tapered segment, or after a suitable distance from the end of the 140 feet segment. In this example, the dynamic indicators 16 are positioned to illuminate a five lane pattern with the leftmost lane L1-1 having a width of 10.5 feet, the left of center lane L2-1 having a width of 10 feet, the center lane L3-1 having a width of 11 feet, the right of center lane L4-1 having a width of 10 feet, and the rightmost lane L5-1 having a width of 10.5 feet. The left shoulder LS and right shoulder RS each will still have a width of 9 feet which does not change throughout the five lane portion of the road segment 18. Also, during the 500 feet long transition portion, an overhead gantry sign 40 can display a signal, such as a flashing or solid red "X," above the center lane L3-1 to indicate to drivers of the vehicles 32 that the center lane L3-1 should not yet be used. Thus, after the after the 500 feet long transition portion of the road segment 18, another overhead gantry sign 40 can display a signal, such as a green arrow, indicating that vehicles 32 can begin to use the center lane L3-1 (the $5^{th}$ lane) that is 11 feet wide.

The dynamic indicators 16 representing the five lane configuration extend from a location beginning within the 500 feet long transition portion at the beginning of the road segment 18, and along the entire road segment 18 to a location ending within the 500 feet long transition portion at the end of the road segment 18 as discussed below. Accordingly, the addition of the center lane L3-1 increases traffic capacity by 25 percent over the four lane configuration, and thus relieves traffic congestion without expanding the highway footprint. Moreover, by occupying a slight portion of the left shoulder LS and the right shoulder RS (e.g., 2 feet of each shoulder), the five lane configuration section easily fits within the existing pavement areas of roads such highways. The narrower lanes are also more optimal for the slower speeds and discourage higher speeds during these times of congestion, near an accident site, or during inclement weather. Thus, the narrower lanes L1-1 through L5-1 also provide speed "calming" to encourage safer operation due to congestion or other incidents, or adverse weather conditions. Also, the system 10 need not be limited changing between four and five lanes, but can be configured to change between any suitable number of lanes. For instance, the system 10 can be configured to change between three lanes and four lanes, five lanes and six lanes, and so on, depending on the number of lanes on the paved road. Also, if the width of the paved road changes in the road segment 18, the system 10 can employ an additional transition portion and, if necessary or desirable, an additional tapered portion, to further change the number of lanes within the road segment. For example, if the width of the paved road changes in the road segment 18 to be wide enough to accommodate five lanes, the system 10 can employ an additional transition portion and, if necessary or desirable, an additional tapered portion, of the types shown in FIGS. 3 through 5, with dynamic indicators 16 arranged to enable a transition from five to six lanes.

Figure 7:
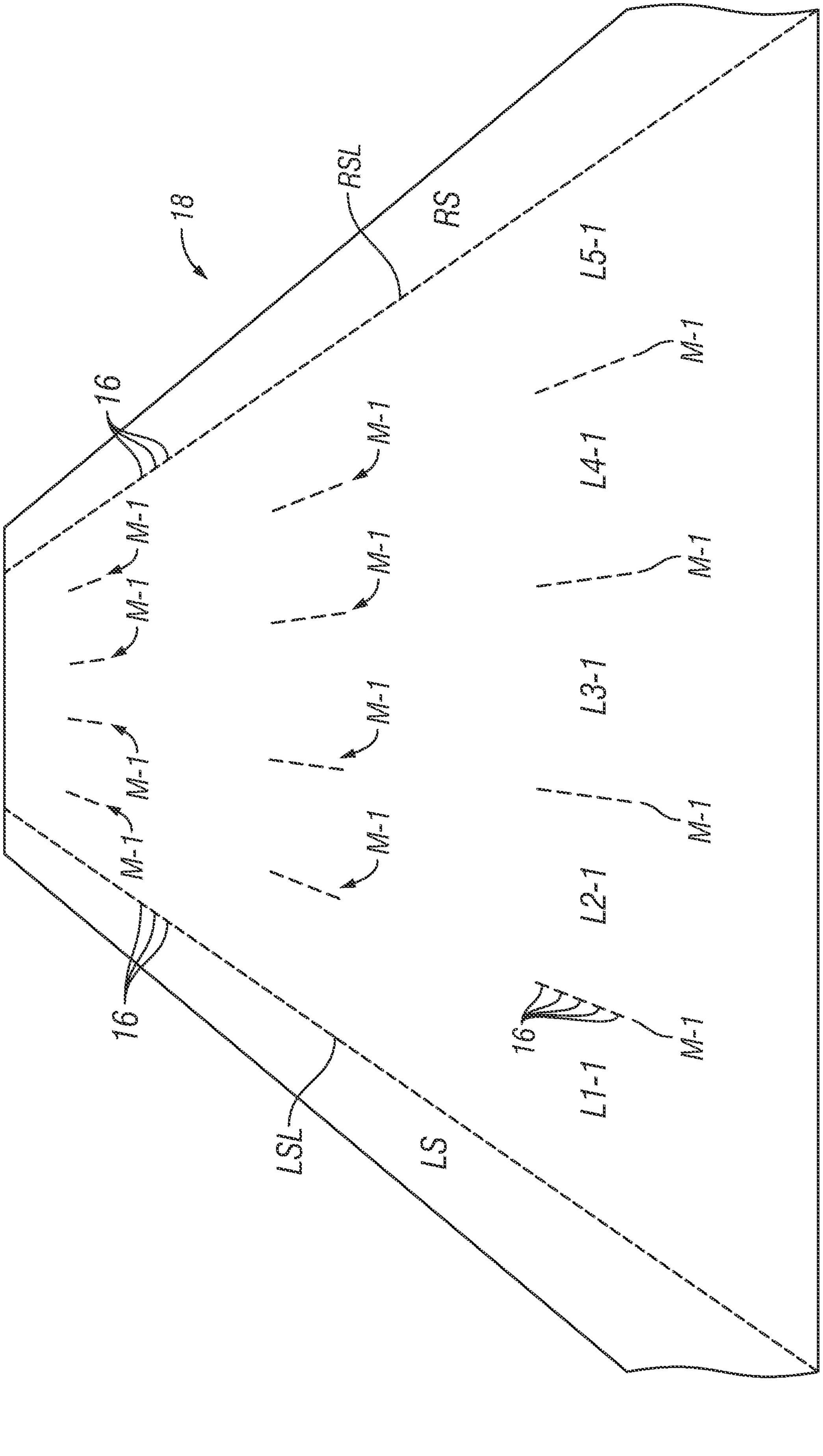
FIG. 7 is a diagrammatic view illustrating an example of a road segment being controlled by the system shown in FIG. 1 to illuminate five road lanes of the road segment under congested traffic conditions.
Figure 8:
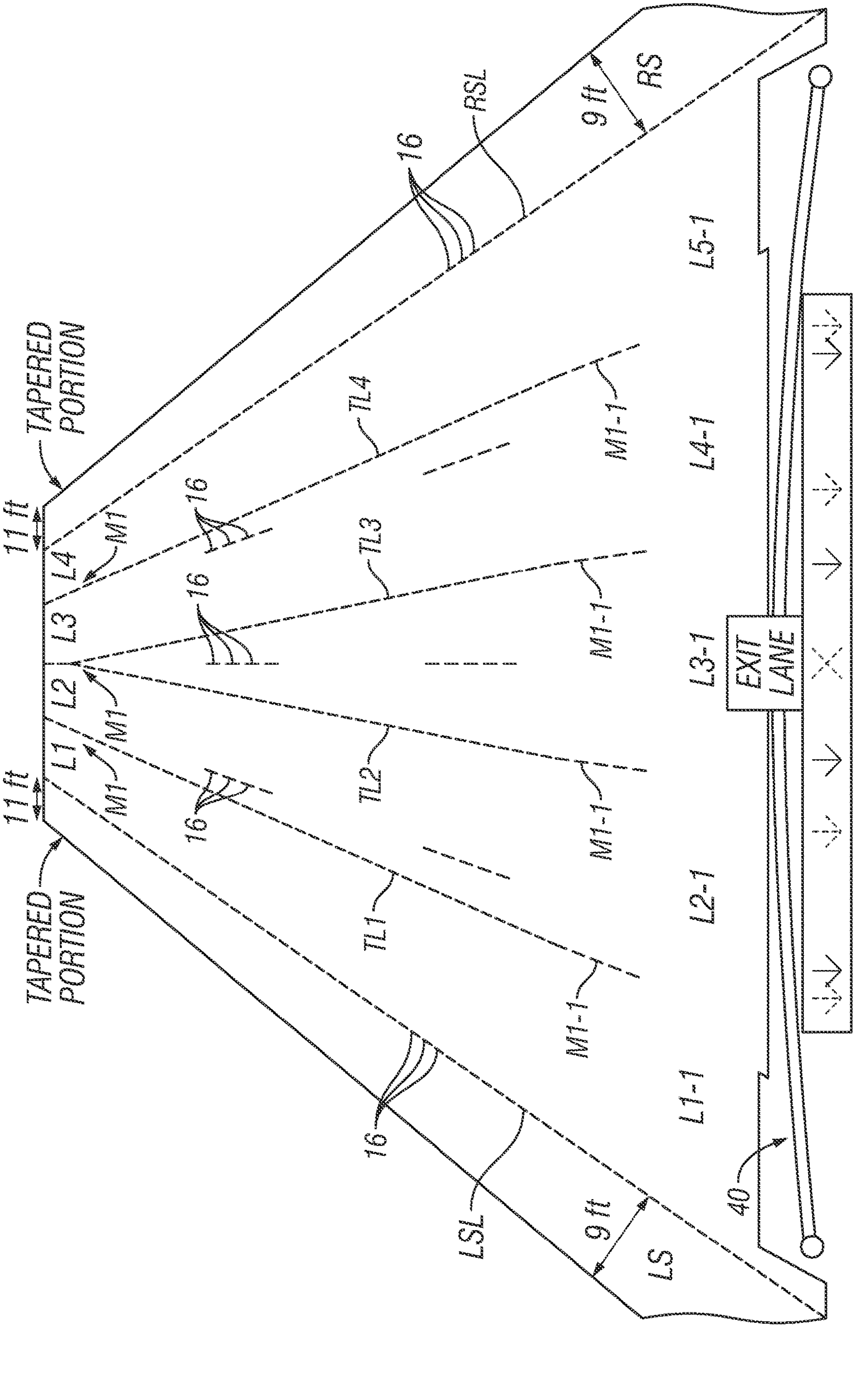
FIG. 8 is a diagrammatic view illustrating an example of a transition between five lanes back to four lanes in the road segment.

As shown in FIG. 7, the controller 12 can continue to control the dynamic indicators 16 representing the lane markers M-1 to represent the five lanes L1-1 through L5-1. At a position near the end of the road segment 18, the controller 12 can control the dynamic indicators 16 to transition back to the original four lane configuration with four lanes L1 through L4. For instance, as shown in FIG. 8, during a 500 feet transition portion near the end of the road segment 18, the controller 12 can control the dynamic indicators 16 to illuminate the lane markers M, the left shoulder line LSL and the right shoulder line RSL to represent the width of the left shoulder LS and the width of the right shoulder RS at 9 feet each, with the leftmost lane L1 having a width of 14 feet wide, the two middle lanes L2 and L3 each having a width of 12 feet, and the rightmost lane L4 having a width of 14 feet.

After this 500 feet transition portion, another 140 feet taper portion exists in which the dynamic indicators 16 representing the left shoulder line LSL and the right shoulder line RSL are configured to increase the width of the left shoulder LS and the width of the right shoulder RS to 11 feet each where the painted shoulder lines and painted lane markers begin again on the road. Naturally, this 140 taper portion can begin at a location within the 500 feet transition portion, or at a position shortly after the 500 feet transition portion. Also, the lengths of the taper portion and the transition portion need not be 140 feet and 500 feet, respectively, but can be any suitable length in a manner consistent with the description herein. Furthermore, the transition portion can include dynamic indicators 16 which are positioned to represent taper lines TL1, TL2, TL3 and TL4 that taper in a direction opposite to that described above to transition from five lanes L1-1 through L5-1 to four lanes L1 through L4. In this example, the middle taper lines TL2 and TL3, in particular, illuminate in yellow or amber, but the taper lines TL1 through TL4 can illuminate in any suitable color such as white, yellow or amber. Also, during the 500 feet long transition portion, an overhead gantry sign 40 can display a signal, such as a flashing or solid red "X," above the center lane L3-1 to indicate to drivers of the vehicles 32 that the center lane L3-1 should no longer be used. Furthermore, if the width of the paved road in the road segment 18 accommodates additional lanes (e.g., six lanes) as discussed above, the system 10 can employ an additional transition portion and, if necessary or desirable, an additional tapered portion, to enable a transition from six lanes to five lanes as the width of the paved road decreases, before decreasing from five lanes to four lanes.

Figure 9:
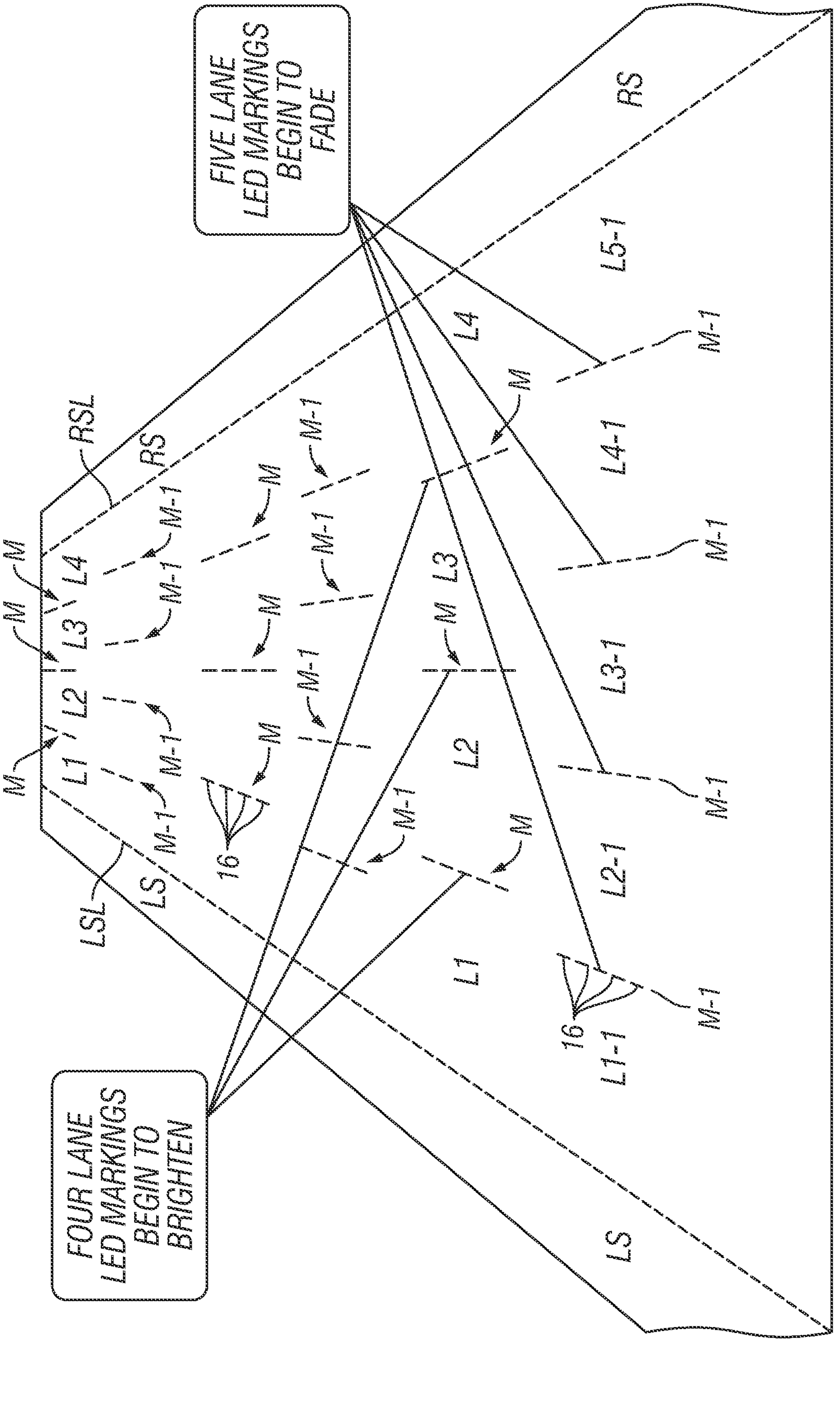
FIG. 9 is a diagrammatic view illustrating an example of a transition between five lanes to four lanes in the road segment.

In addition, as shown in FIG. 9, the controller 12 can control the dynamic indicators 16 representing the lane markers M-1 for the five lanes to fade in illumination while the controller controls the dynamic indicators representing the lane markers M for the four lanes to increase in intensity. At this time, the overhead gantry sign 40 can display, for example, green arrows indicating that four lanes L1 through L4 are open. At the end of the road segment 18, the dynamic indicators 16 end, and the road markers and shoulder lines are represented by conventional painted lines.

As can be appreciated from the above, the system 10 described herein saves significant costs when compared to construction costs for physically adding a lane to a road segment. The system 10 also avoids the costs and time required to acquire additional right-of-way and environmental impact studies associated with increasing the physical size of a roadway to add a lane. For instance, the system 10 can be implemented in months. The system 10 also avoids traffic disruptions commonly associated with physically widening a road, as well as changes in storm runoff, noise to surrounding areas and so on. Moreover, the decreased lane widths in the congested areas results in slower speeds which can increase driving safety.

In addition, the illuminated markers and lines as discussed above are more visible at night and during adverse weather conditions such as rainstorms, fog, ice and snow events. The system 10 can use white lighting in the dynamic indicators 16 for all interior lane markings, but utilize yellow in dynamic indicators 16 along perimeter conditions of lanes. Also, the overhead gantry signs 40 can display additional road information can be clearly and regularly provided to motorists. The gantry signs 40 can convey information on approaching backups, accidents, and other occurrences that impact the operations of the traditionally designed speed road. Additionally, the system 10 can control the dynamic indicators 16 to allows for the creation of a "fare" lanes (e.g., as designed by illumination color) to enable vehicles to travel in less congested lanes but pay for such usage.

It can further be appreciated that the controller 12 can control the dynamic indicators 16 representing the lane markers M and M-1, as well as the overhead gantry signs 40, to provide transitioning from, for example, the four lane operation to the five lane operation and vice-versa at the beginning and end of the congestion scenario as discussed above. For instance, if a known congestion scenario such as increased traffic during rush hour occurs at particular times during the day, the controller 12 can control the dynamic indicators 16 as discussed herein to provide the five lane operation during the rush hour period and the four lane operation during the non-rush hour period. Naturally, there is likely to be vehicles 32 already present within the road segment 18 when the rush hour period begins and ends. Thus, the controller 12 controls the lane markers M and M-1, and the overhead gantry signs 40, to perform this change between the four and five lane operations, and the five and four lane operations, in a manner that safely and effectively transitions the vehicles 32 within the road segment 18 into the appropriate lanes. Although for purposes of this discussion the controller 12 is described as controlling the lane markers M and M-1, it should be understood that the controller 12 is controlling the dynamic indicators 16 as discussed herein to achieve the operations of the lane markers M and M-1 as discussed herein. Naturally, the controller 12 can also control the dynamic indicators 16 that form the taper lines TL1, TL2, TL3 and TL4, left shoulder line LSL and the right shoulder line RSL in any appropriate manner as consistent with the operations described herein.

Figure 10:
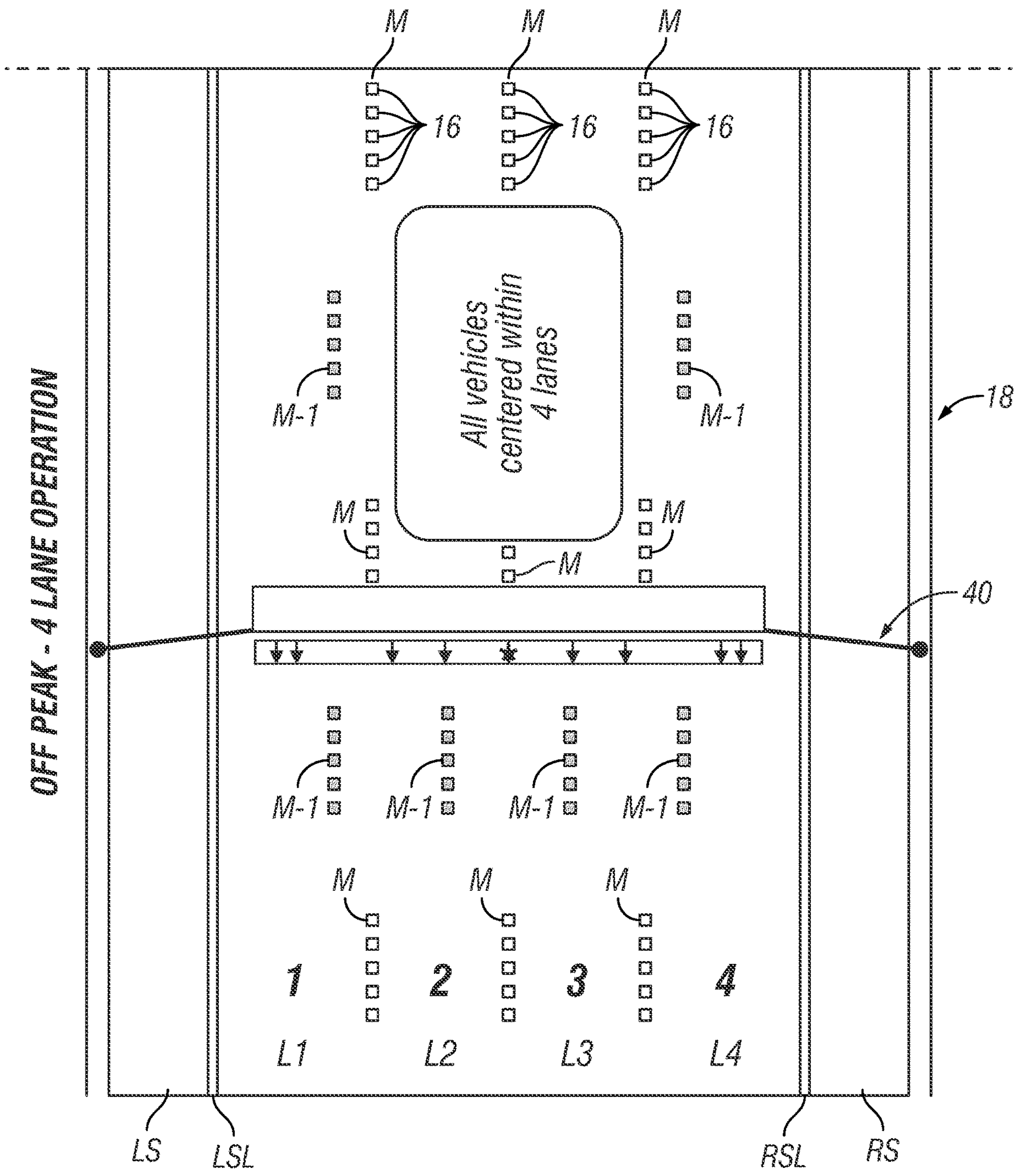
FIGS. 10 through 27 are diagrammatic views illustrating an example of operations for controlling the system as shown in FIGS. 1 through 9 to transition between four lanes to five lanes and back again in a main section of the road segment according to a disclosed embodiment.

FIG. 10 illustrates an example of a portion (e.g., a main portion) of the road segment 18 as shown, for example, in FIGS. 6 and 7, which is between the transitional portions of the road segment 18 as shown, for example, in FIGS. 5 and 8 as discussed above. During the off-peak situation, such as during a non-rush hour period, the controller 12 controls the lane markers M to be active to provide lanes L1 through L4 having the widths as discussed herein, while the controller 12 deactivates the lane markers M-1. The controller 12 further controls the overhead gantries 40 and any other suitable dynamic message signs (DMS) to indicate that the four lanes L1 through L4 are open. Also, as discussed herein, the controller 12, the ITS or both can wirelessly communicate information pertaining to the road lane configuration to the communication devices 30 on the vehicles 32 so that the vehicles 32 can, for example, provide this information to their drivers via visual and/or audio representations, such as on a GPS map display, via audible warnings and so on, and via the driver's smart phone or any other suitable device. It should also be understood that the controller 12 can control the lane markers M and M-1, as well as the overhead gantries 40 and any other suitable DMS, and also provide appropriate communication as discussed herein, in the same or similar manner throughout the entire main portion of the road segment 18. It should also be noted that although, as discussed above, the left shoulder line LSL and the right shoulder line RSL are positioned to provide shoulder widths of 9 feet in the main portion of the road segment 18, the road segment 18 can include an additional left shoulder line and right shoulder line that can run in parallel or substantially in parallel with the respective left shoulder line LSL and right shoulder line RSL to provide left and right shoulders having widths of 11 feet or any other suitable widths. These additional left and right shoulder lines can include dynamic indicators 16 that the controller 12 can control in a manner consistent with that described herein to provide the right and left shoulders having widths of 11 feet or any other suitable widths.

Figure 11:
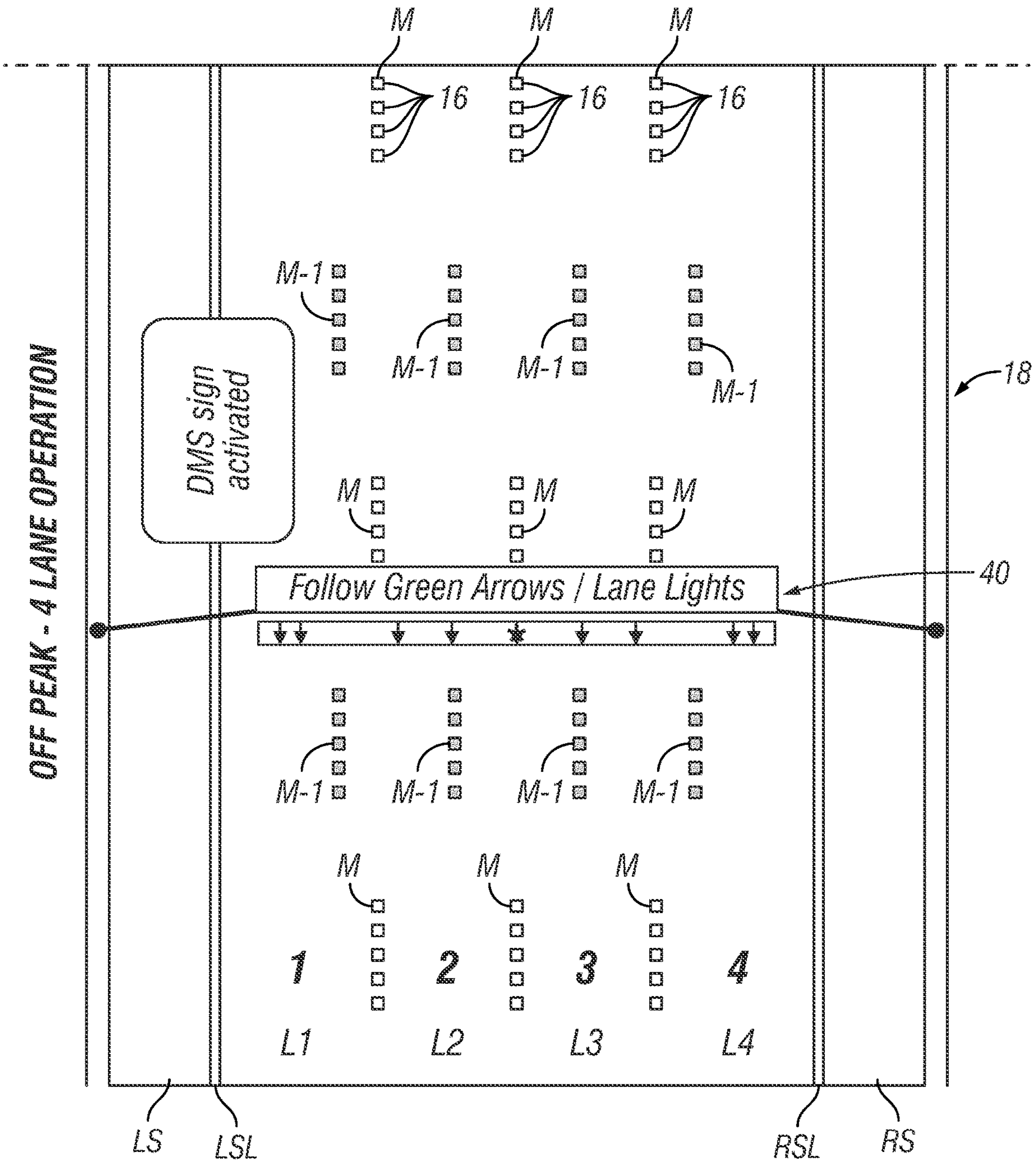

As shown in FIG. 11, the congestion situation, such as the beginning of rush hour, is about to begin. Therefore, as indicated, the controller 12 controls the lane markers M to continue to be active to provide lanes L1 through L4 having the widths as discussed herein, while the controller 12 continues to deactivate the lane markers M-1. The controller 12 further controls the overhead gantries 40 and any other suitable dynamic message signs (DMS) to indicate that the four lanes L1 through L4 are open, but now controls the overhead gantries 40 to display additional information as indicated, such as "follow green arrows/lane lights," as well as speed information and any other suitable information as discussed herein and as would be appreciated by one skilled in the art. This information can also be provided to the vehicles 32 and the drivers as discussed above. Therefore, the controller 12 increases awareness to the drivers via the information on the overhead gantries 40 and so on.

Figure 12:
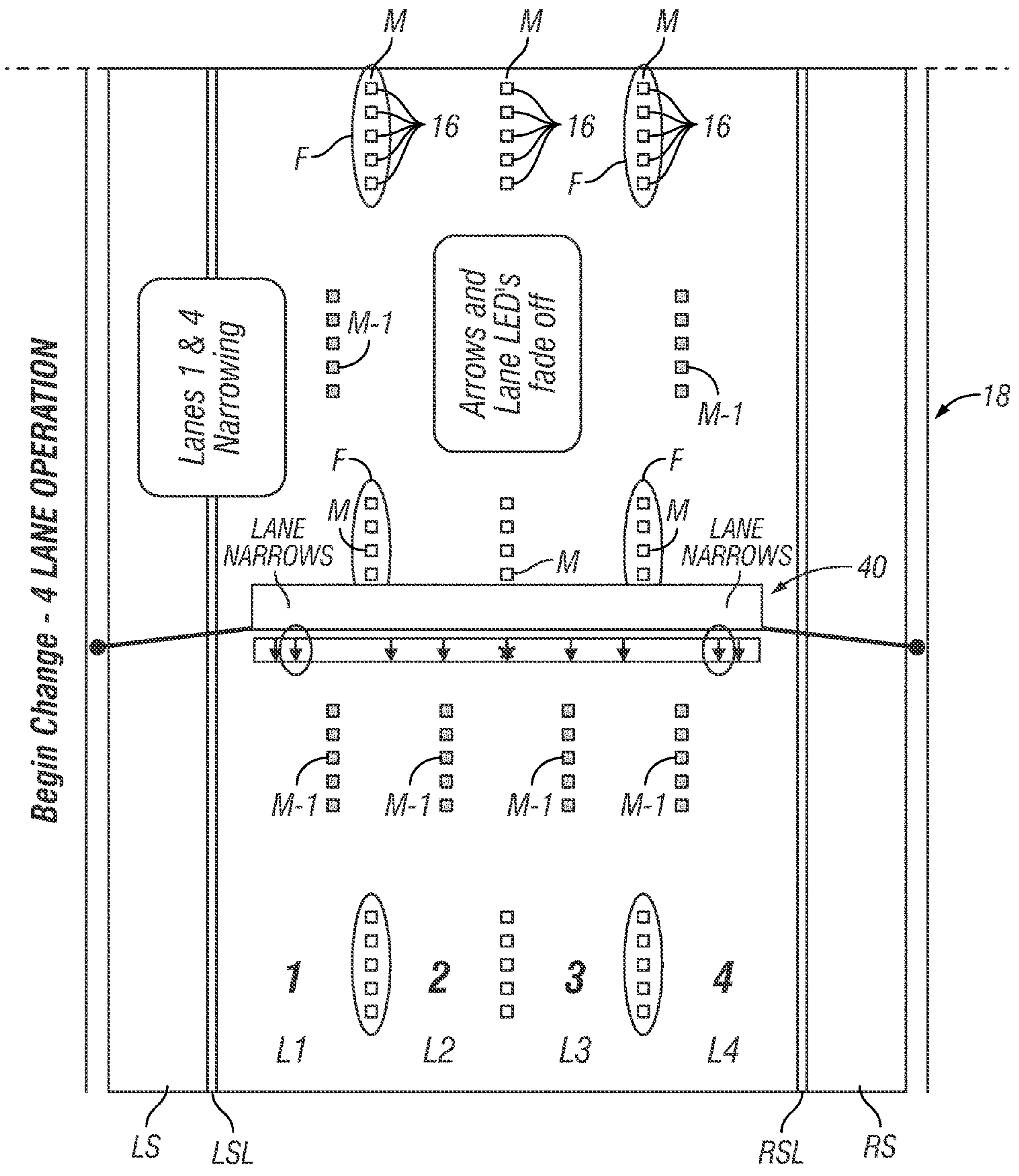

As shown in FIG. 12, as the beginning of rush hour (the congestion situation) becomes closer in time, the controller 12 controls the lane markers M to continue to be active to provide lanes L1 through L4 having the widths as discussed herein, while the controller 12 continues to deactivate the lane markers M-1. However, as indicated, the controller 12 begins to control some of the lane markers M, designated by F as encircled in FIG. 12, to begin to fade in intensity. For instance, if dynamic indicators 16 of the markers M are configured as illumination devices such as lights, the controller 12 controls those dynamic indicators 16 to fade in illumination. The controller 12 further controls the overhead gantries 40 and any other suitable dynamic message signs (DMS) to indicate that the four lanes L1 through L4 are open, but now controls the overhead gantries 40 to display additional information as indicated, such as "lane narrows" as well as speed information and any other suitable information as discussed herein and as would be appreciated by one skilled in the art. This information can also be provided to the vehicles 32 and the drivers as discussed above.

Figure 13:
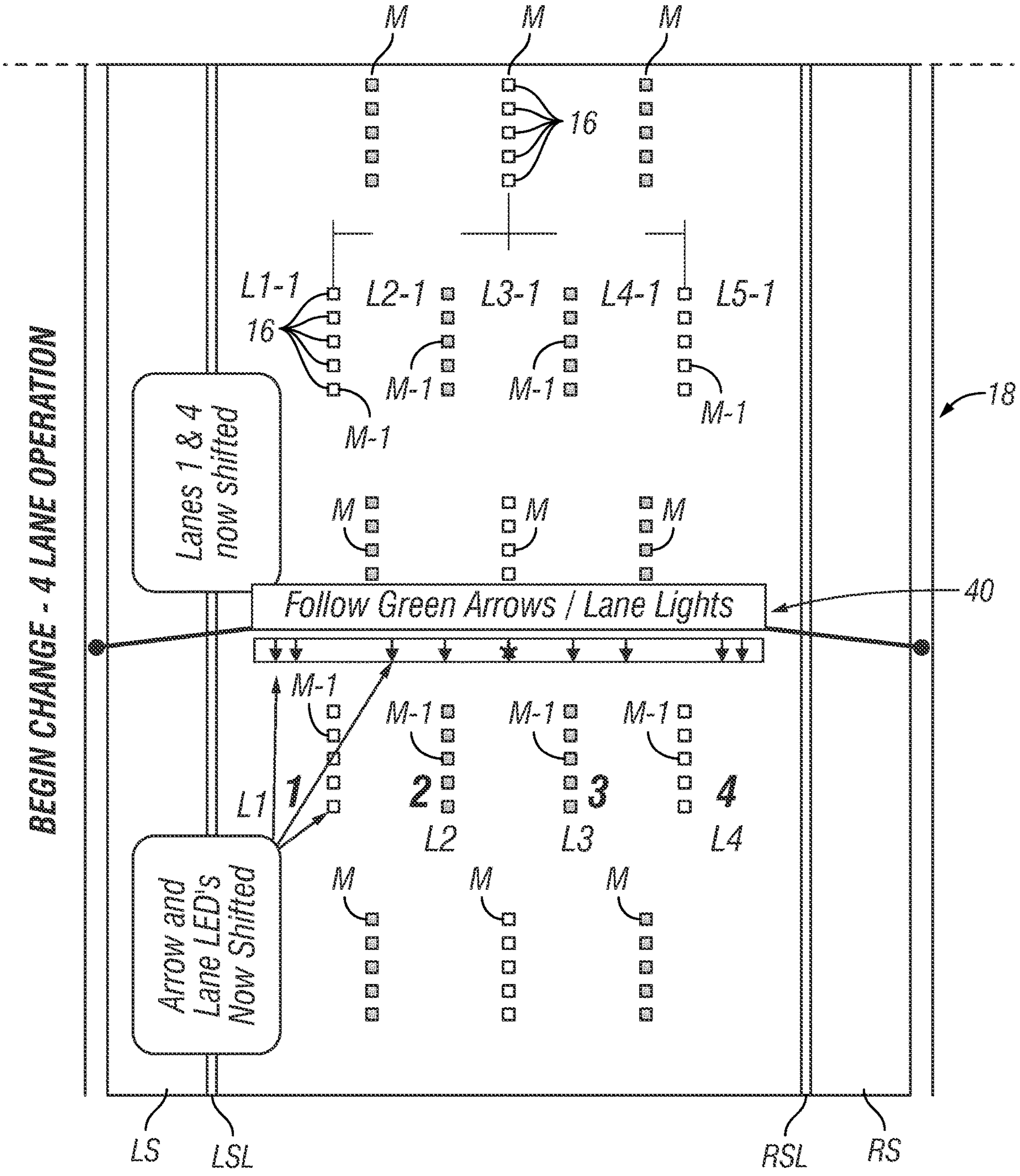
Figure 14:
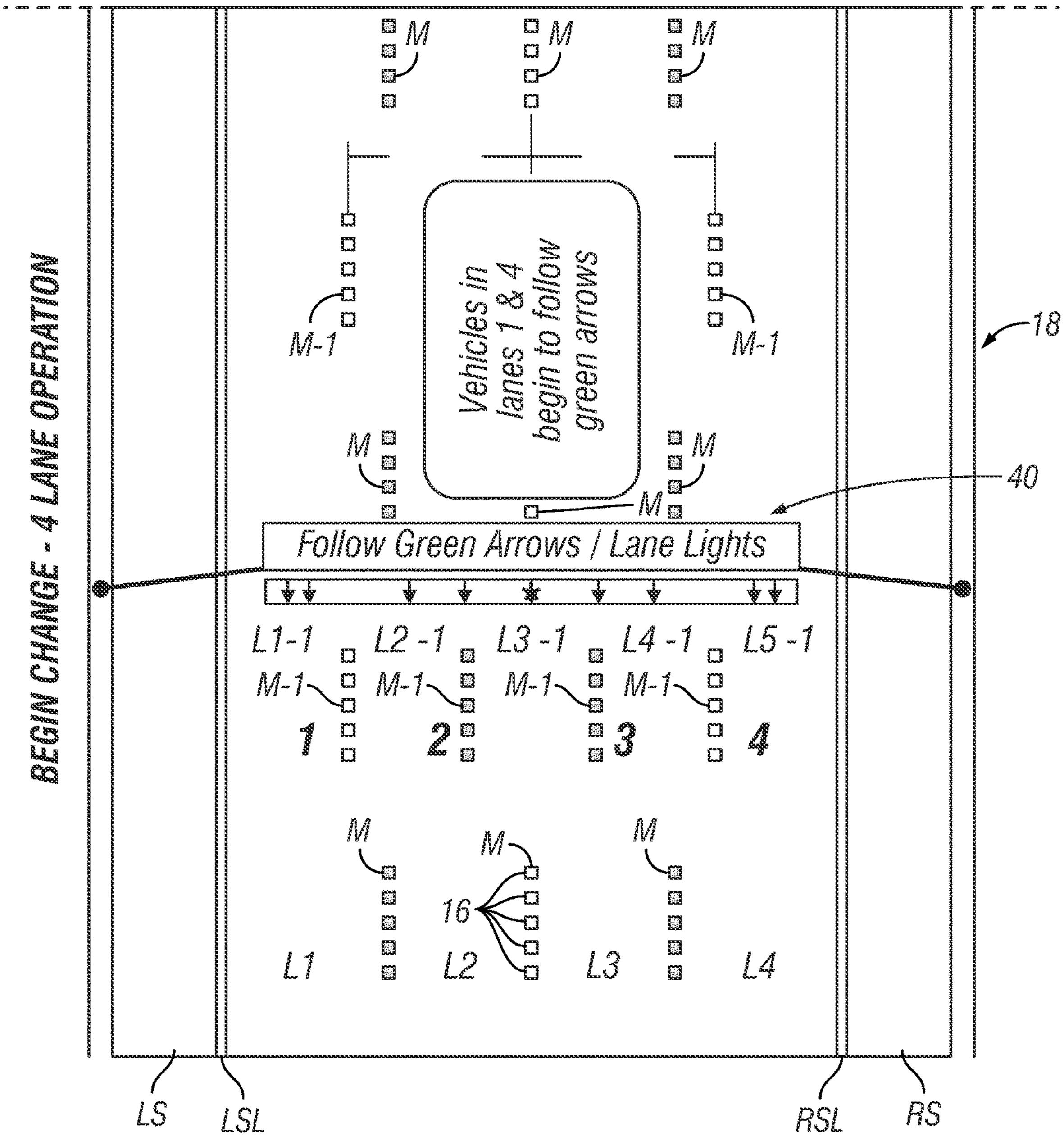
Figure 15:
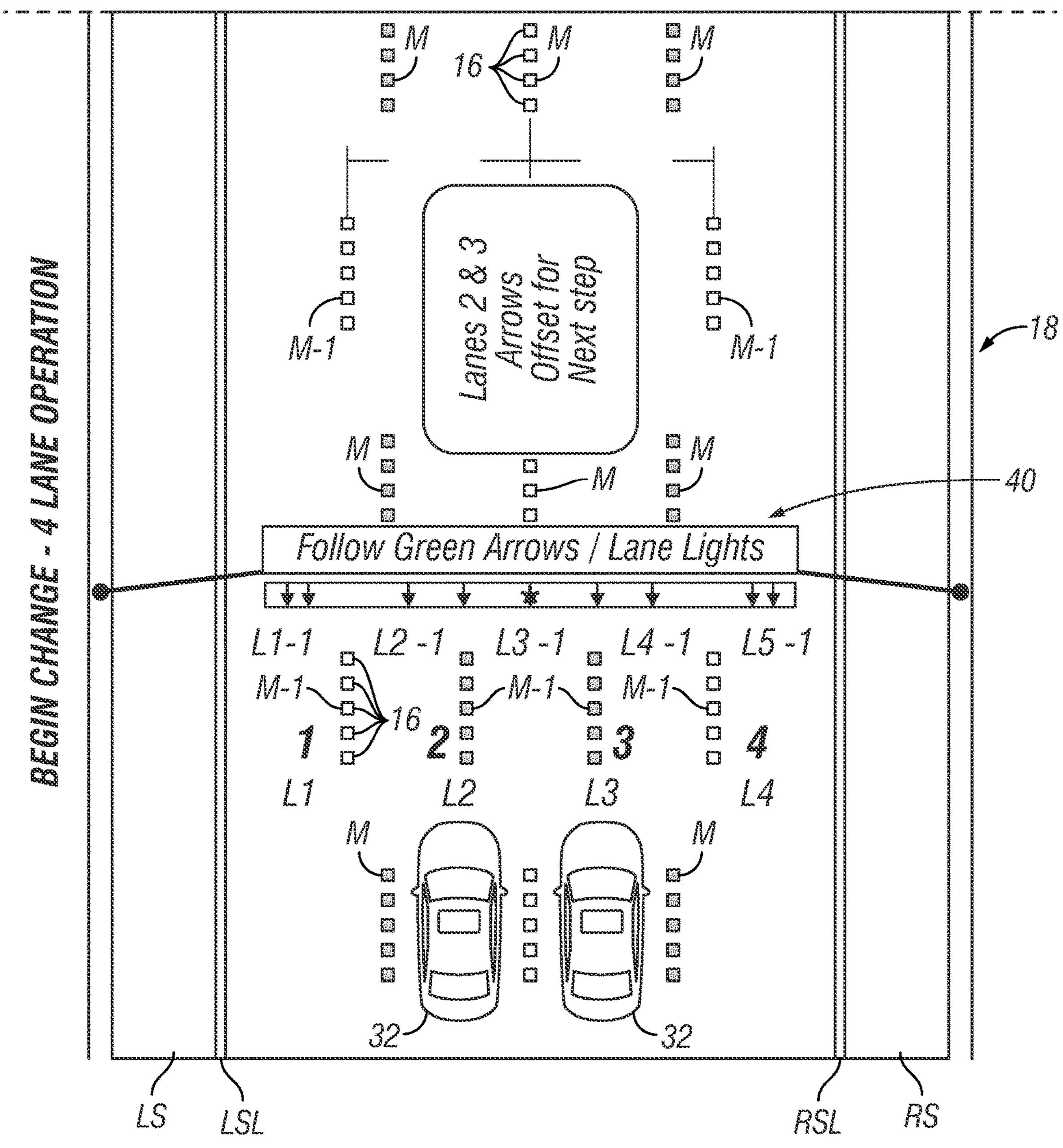
Figure 16:
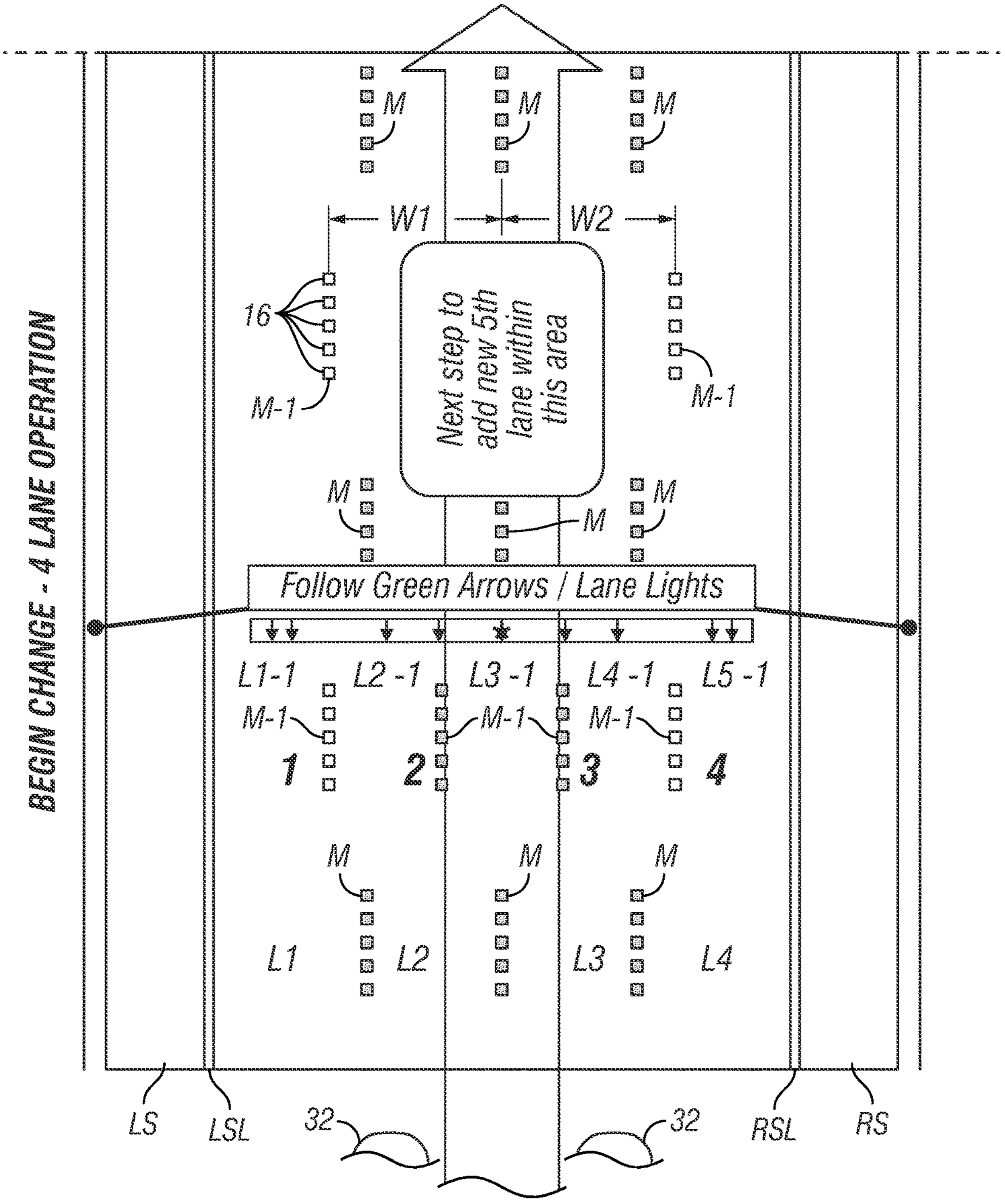

As shown in FIG. 13, as the beginning of rush hour (the congestion situation) becomes even closer in time, the controller 12 controls some of the lane markers M to continue to be active, while the controller 12 controls the lane markers M designated by F in FIG. 12 to become deactivated. As further shown, the controller 12 begins to control some of the lane markers M-1, to become activated. The controller 12 further controls the overhead gantries 40 and any other suitable dynamic message signs (DMS) to indicate that the four lanes L1 through L4 are still open, but as indicated the positions of the green arrows have changed to be more aligned with the five lane L1 through L5 configuration. The controller 12 further controls the overhead gantries 40 to display additional information as indicated, such as "follow green arrows/lane lights" as well as speed information and any other suitable information as discussed herein and as would be appreciated by one skilled in the art. This information can also be provided to the vehicles 32 and the drivers as discussed above. Thus, as shown in FIGS. 14 through 16, vehicles 32 should begin to reposition themselves to follow the green arrows.

Figure 17:
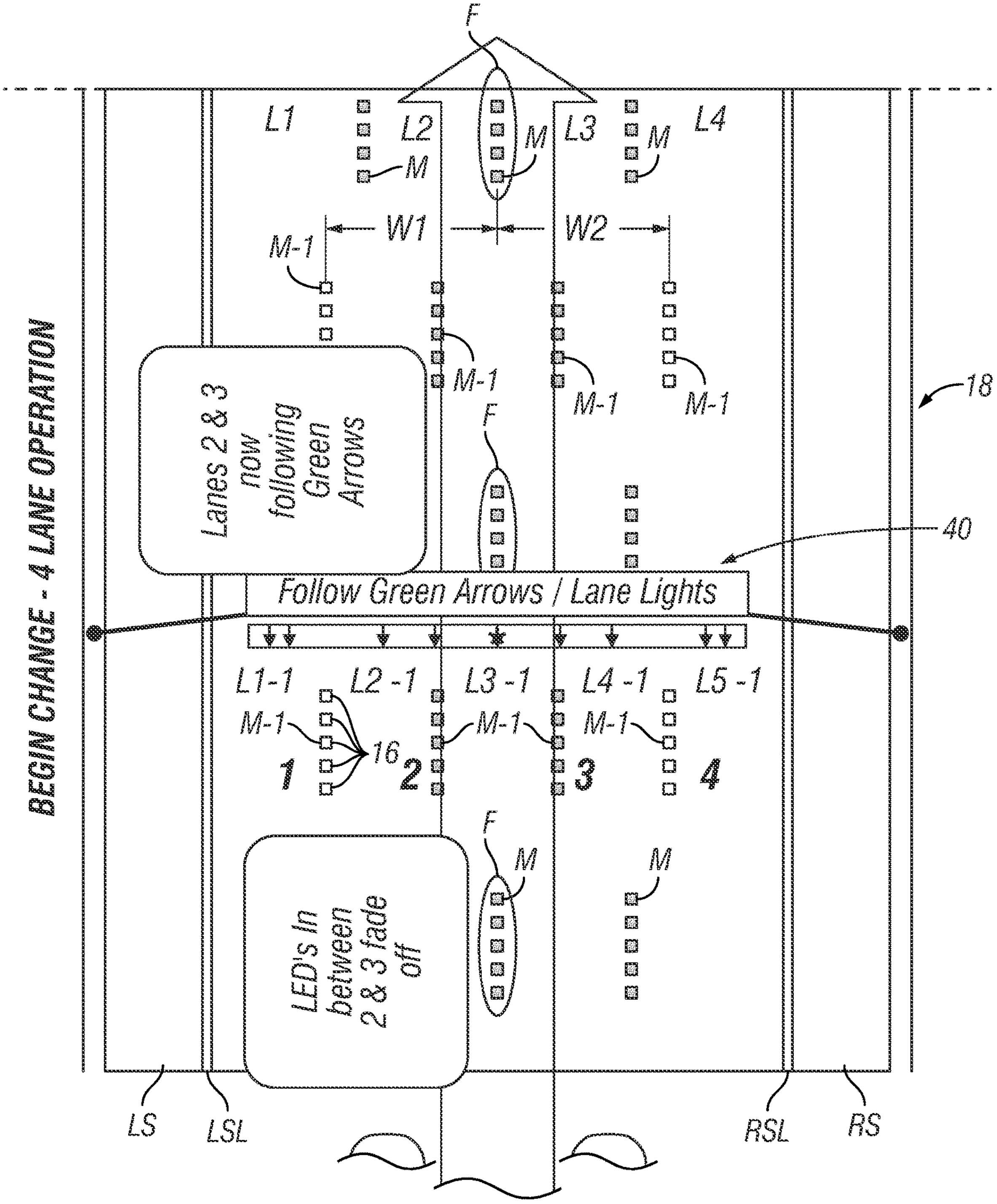

As shown in FIG. 17, as the beginning of rush hour (the congestion situation) becomes even closer in time, the controller 12 has by this time is controlling the lane markers M to be inactive, while the controller 12 controls the lane markers M-1 to be active. As shown, the lane markers M designated by F in FIG. 17 can be the last to become deactivated, to thus accommodate the middle lane L3-1 of the five lane configuration. The controller 12 further controls the overhead gantries 40 and any other suitable dynamic message signs (DMS) to indicate that the four lanes L1 through L4 are still open, but as indicated the positions of the green arrows remain changed to be more aligned with the five lane L1-1 through L5-1 configuration. The widths of the five lanes L1-1 through L5-1 can be as described above or any other suitable widths. In one example, the lanes L1-1 through L5-1 can be configured with respect to the middle lane maker M such that the leftmost lane marker M1 is a distance W1 from the middle lane marker M and the rightmost lane marker M1 is at a distance W2 from the middle lane marker M as shown in FIGS. 16 and 17. The widths W1 and W2 can each be, for example, 15.5 feet, or any other suitable widths to achieve the operations described herein. The controller 12 further controls the overhead gantries 40 to display additional information as indicated, such as "follow green arrows/lane lights" as well as speed information and any other suitable information as discussed herein and as would be appreciated by one skilled in the art. This information can also be provided to the vehicles 32 and the drivers as discussed above.

Figure 18:
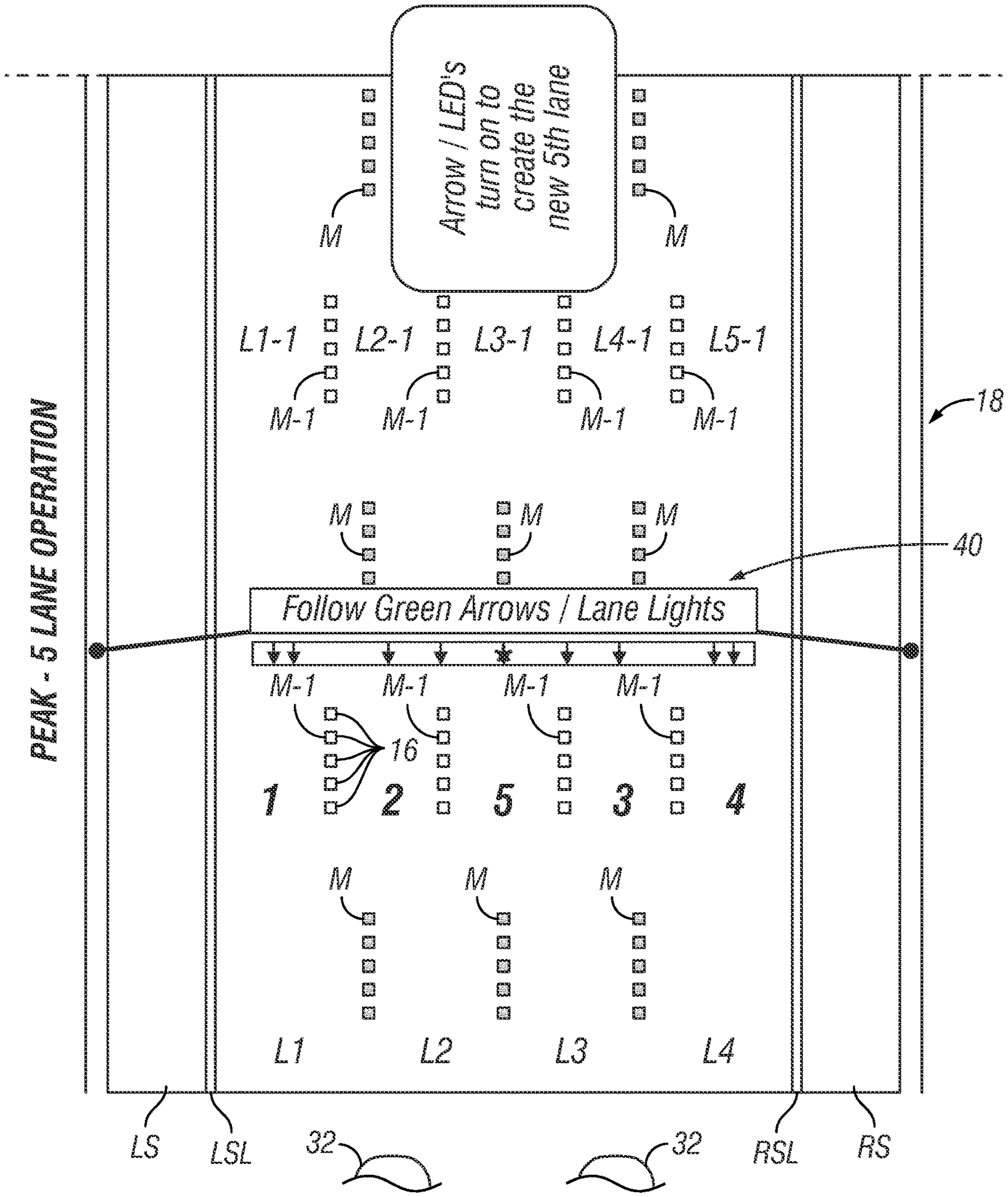

As shown in FIG. 18, as rush hour (the congestion situation) now begins, the controller 12 controls the lane markers M to continue to be inactive, while the controller 12 controls the lane markers M-1 to be active to provide the five lane L1-1 through L5-1 configuration. The controller 12 further controls the overhead gantries 40 and any other suitable dynamic message signs (DMS) to indicate that the five lanes L1-1 through L5-1 are open, and further controls the overhead gantries 40 to display additional information as indicated, such as "follow green arrows/lane lights" as well as speed information and any other suitable information as discussed herein and as would be appreciated by one skilled in the art. This information can also be provided to the vehicles 32 and the drivers as discussed above.

Figure 19:
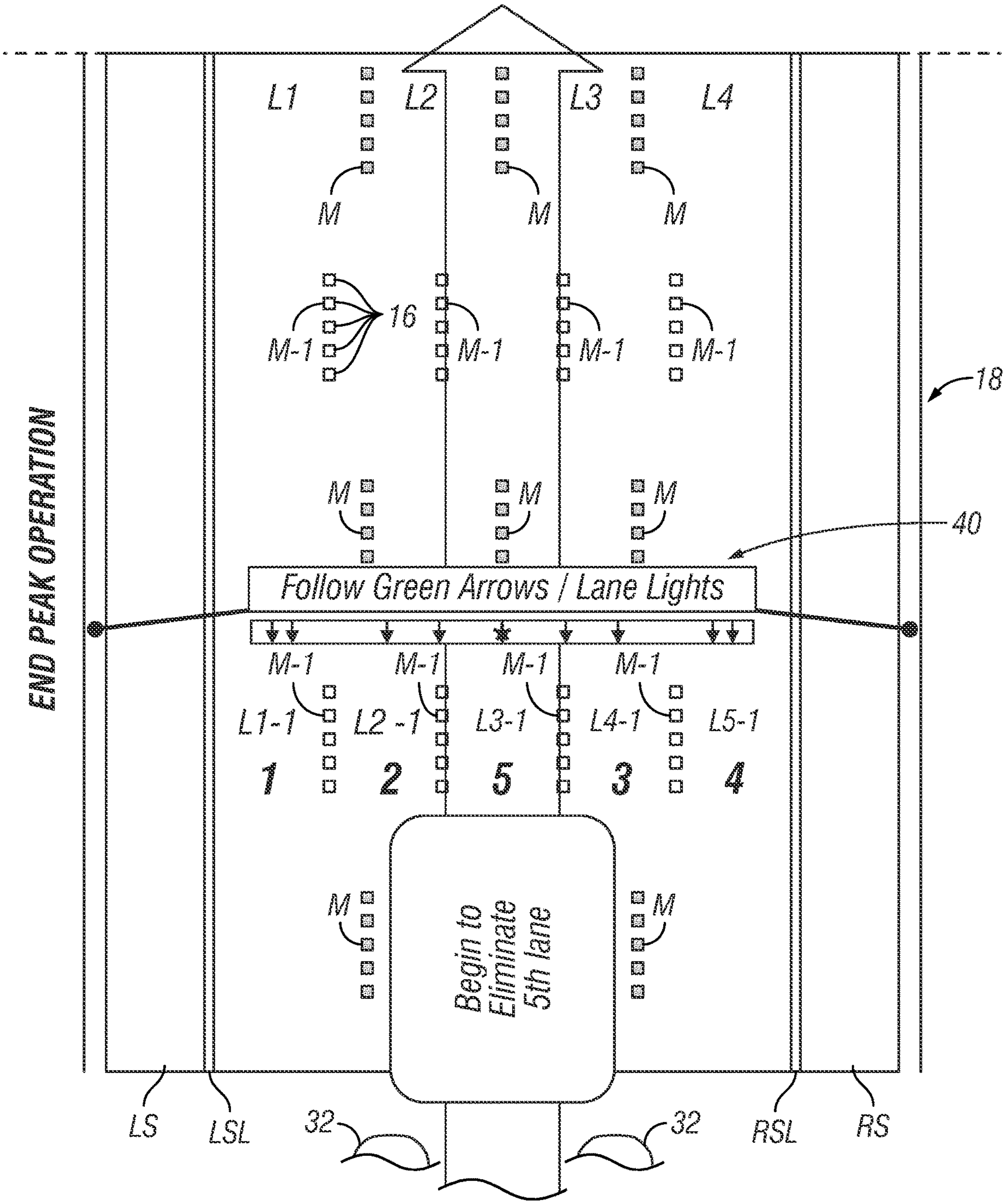

The configuration shown in FIG. 18 can continue for the entire rush hour (congestion situation) period, such as from at or about 6:30 AM to at or about 9:30 AM in one direction, and from at or about 3:30 PM to at or about 6:30 PM in the other direction. Then, as shown in FIG. 19, as the end of rush hour (the congestion situation) begins to approach, the controller 12 begins operations to transition the main portion of the road segment 18 from the five lane configuration L1-1 through L5-1 back to the four lane configuration L1 through L4. As shown, the controller 12 controls the overhead gantries 40 and any other suitable dynamic message signs (DMS) to indicate that the five lanes L1-1 through L5-1 are still open. The controller 12 further controls the overhead gantries 40 to display additional information as indicated, such as "follow green arrows/lane lights" as well as speed information and any other suitable information as discussed herein and as would be appreciated by one skilled in the art. This information can also be provided to the vehicles 32 and the drivers as discussed above.

Figure 20:
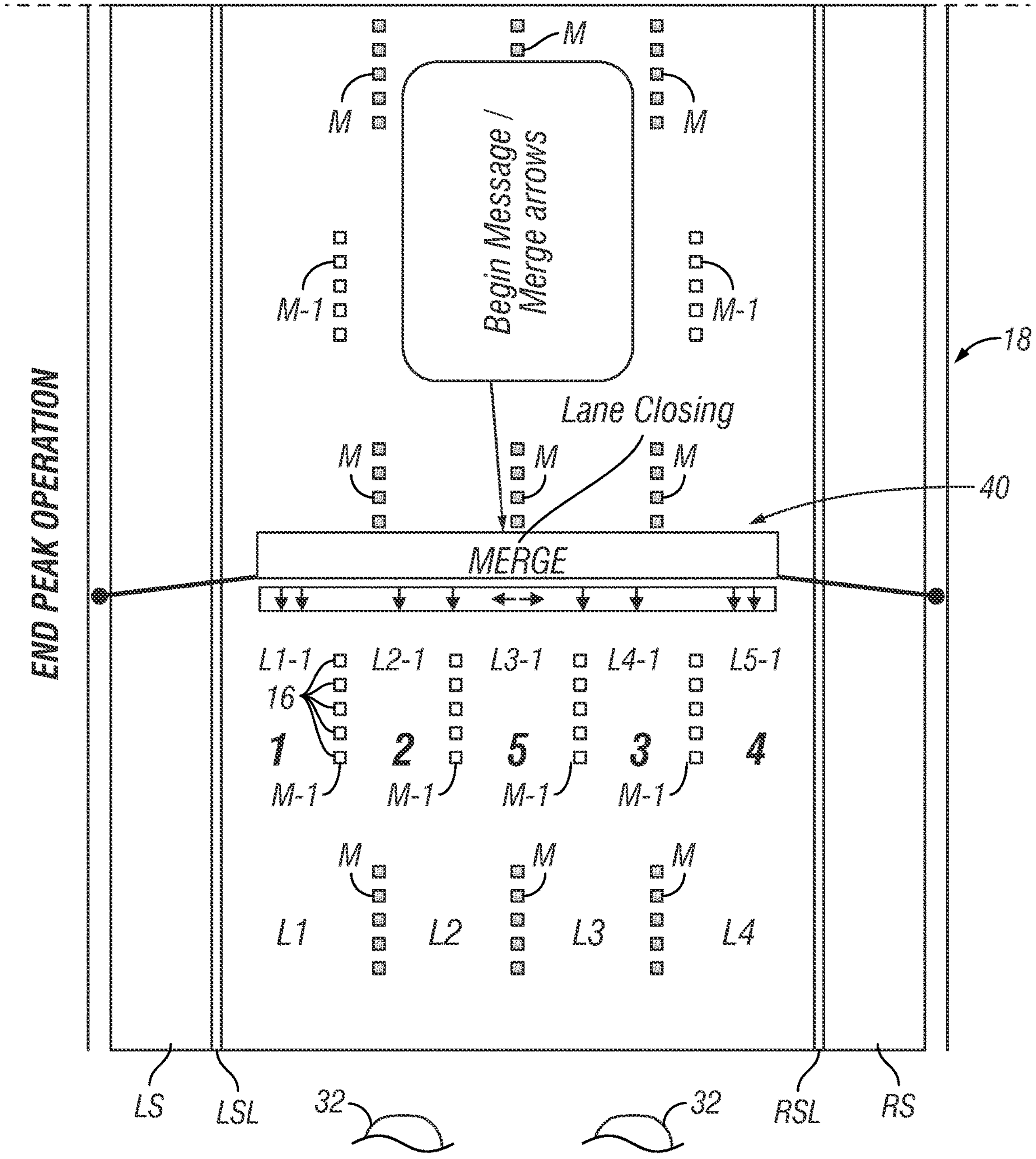

As shown in FIG. 20, as the end of rush hour (the congestion situation) continues to approach in time, the controller 12 begins operations to fade out some of the lane markers M-1 of the five lane configuration. The controller 12 also controls the overhead gantries 40 and any other suitable dynamic message signs (DMS) to indicate that the middle lane L3-1 of the five lanes L1-1 through L5-1 is going to close, and that the vehicle 32 should merge to the left or right (e.g., "lane closing MERGE"). This information can also be provided to the vehicles 32 and the drivers as discussed above.

Figure 21:
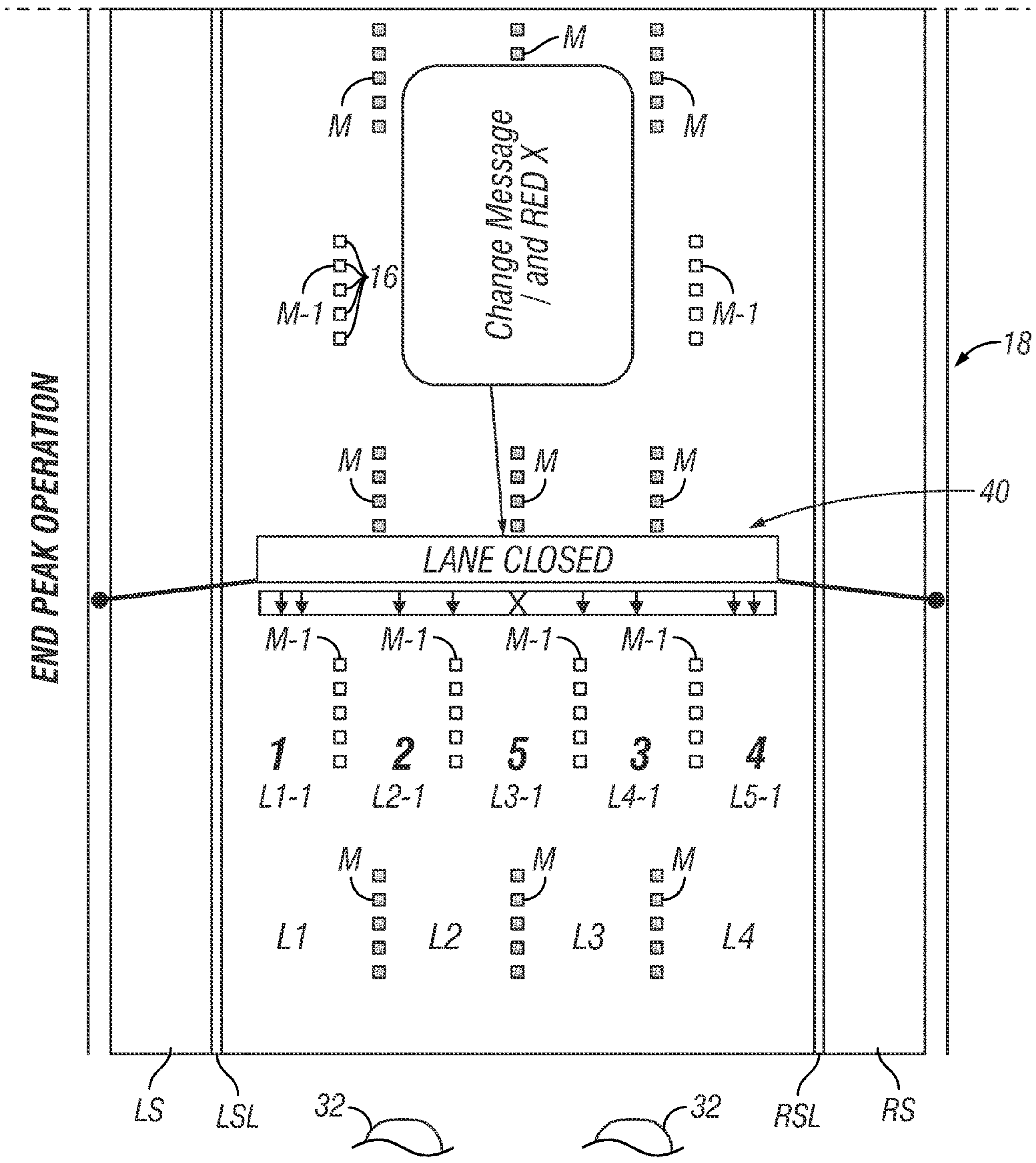
Figure 22:
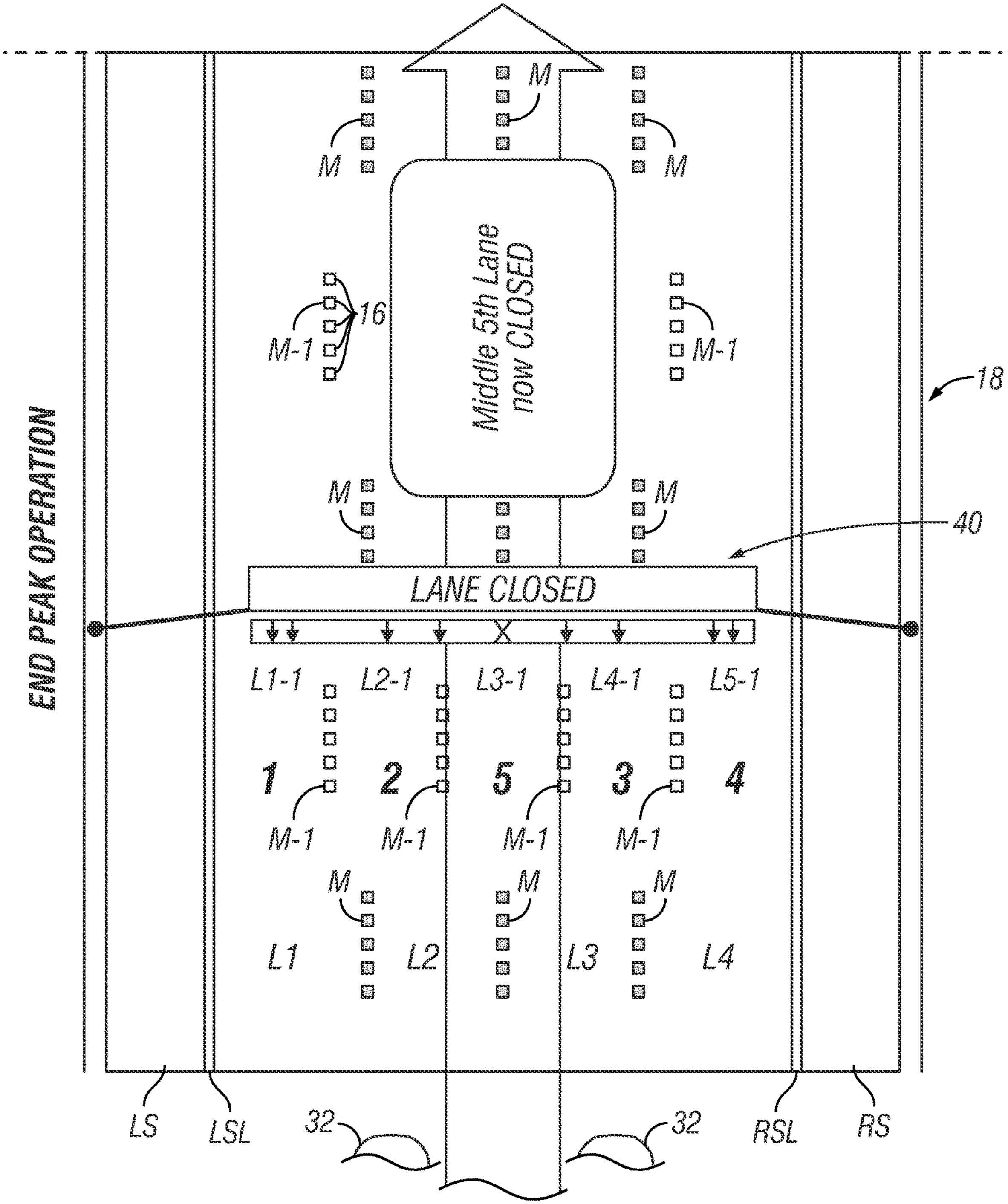

As shown in FIGS. 21 and 22, as the end of rush hour (the congestion situation) becomes even closer in time, the controller 12 continues to fade out some of the lane markers M-1 of the five lane configuration. The controller 12 also controls the overhead gantries 40 and any other suitable dynamic message signs (DMS) to indicate that the middle lane L3-1 of the five lanes L1-1 through L5-1 is now closed (e.g., a Red X and a message "LANE CLOSED" is displayed), and that the vehicle 32 must exit the middle lane. This information can also be provided to the vehicles 32 and the drivers as discussed above.

Figure 23:
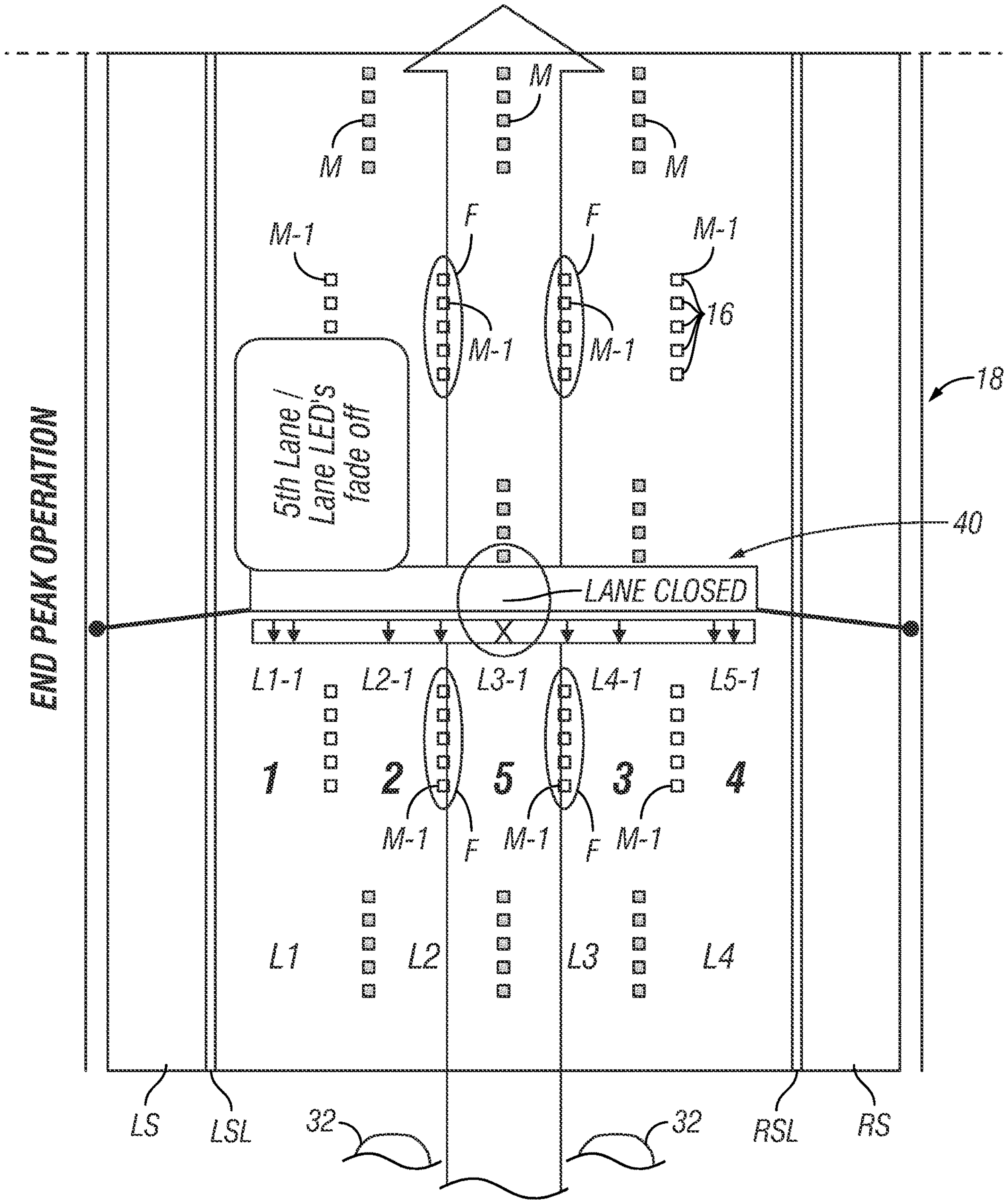

As shown in FIG. 23, as the beginning of rush hour (the congestion situation) becomes even closer in time, the controller 12 continues to control some of the lane markers M-1 to continue to be active, while the controller 12 controls the lane markers M-1 designated by F in FIG. 23 to become deactivated. The controller 12 further controls the overhead gantries 40 and any other suitable dynamic message signs (DMS) to indicate that four lanes L1 through L4 are open, but as indicated the positions of the four green arrows continue to be more aligned with the lanes L1-1, L2-1, L4-1 of the five lane configuration. The controller 12 further controls the overhead gantries 40 to discontinue displaying that the middle lane (Lane L3-1) is closed (e.g., the overhead gantries 40 discontinue displaying the Red X and the "LANE CLOSED" information), and continue to display information such as speed information and any other suitable information as discussed herein and as would be appreciated by one skilled in the art. This information can also be provided to the vehicles 32 and the drivers as discussed above. Thus, as shown in FIG. 23, vehicles 32 should begin to reposition themselves to follow the green arrows.

Figure 24:
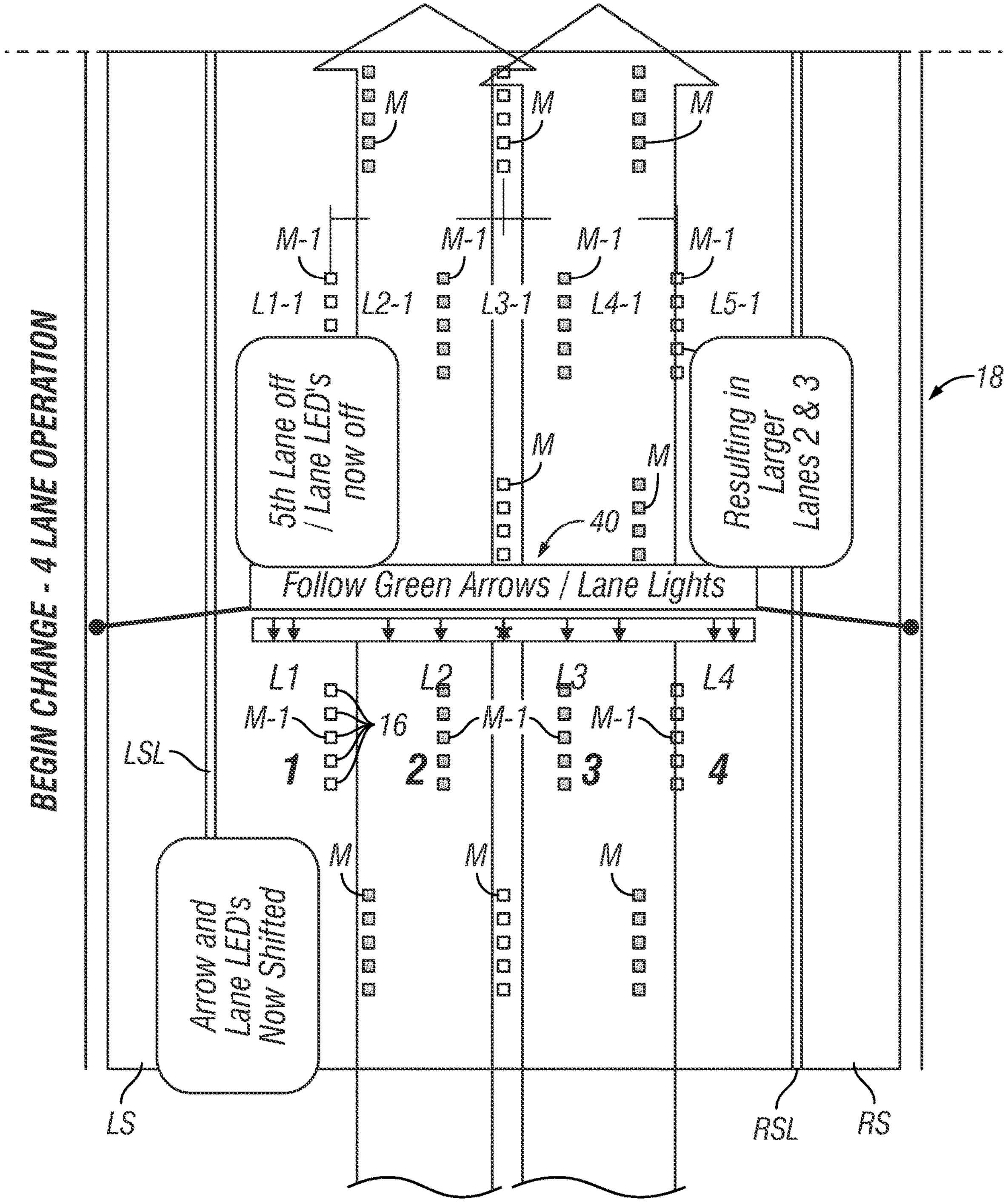
Figure 25:
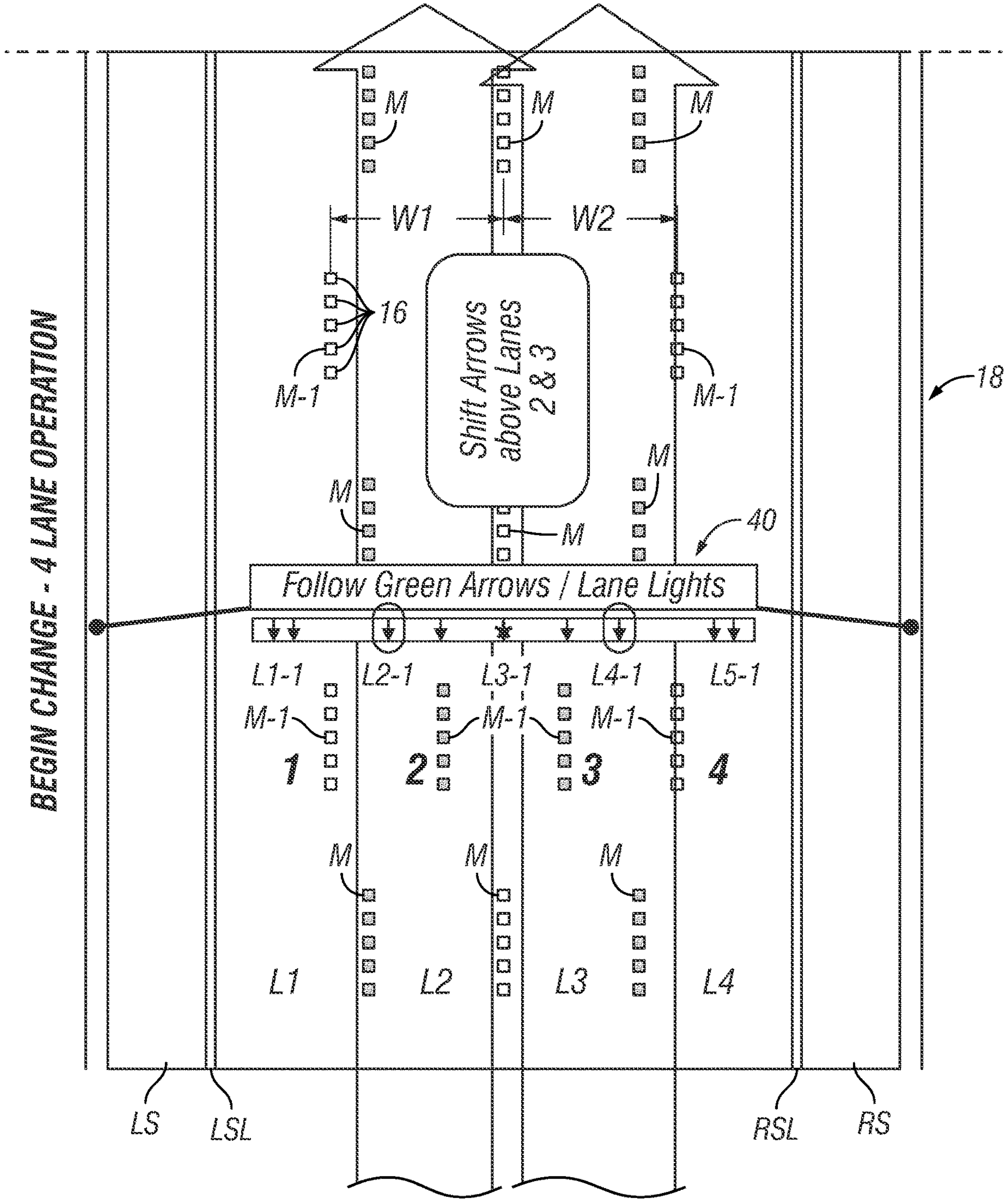

As shown in FIGS. 24 and 25, as rush hour (the congestion situation) has almost ended, the controller 12 controls some of the lane markers M to become active, while the controller 12 controls continue to control some of the lane markers M-1 become deactivated. The controller 12 further controls the overhead gantries 40 and any other suitable dynamic message signs (DMS) to indicate that the four lanes L1 through L4 are open, but as indicated the positions of the green arrows have changed to be more aligned with the five lane L1-1 through L5-1 configuration. The controller 12 further controls the overhead gantries 40 to display additional information as indicated, such as "follow green arrows/lane lights" as well as speed information and any other suitable information as discussed herein and as would be appreciated by one skilled in the art. This information can also be provided to the vehicles 32 and the drivers as discussed above. Thus, the vehicles 32 should continue to reposition themselves to follow the green arrows.

Figure 26:
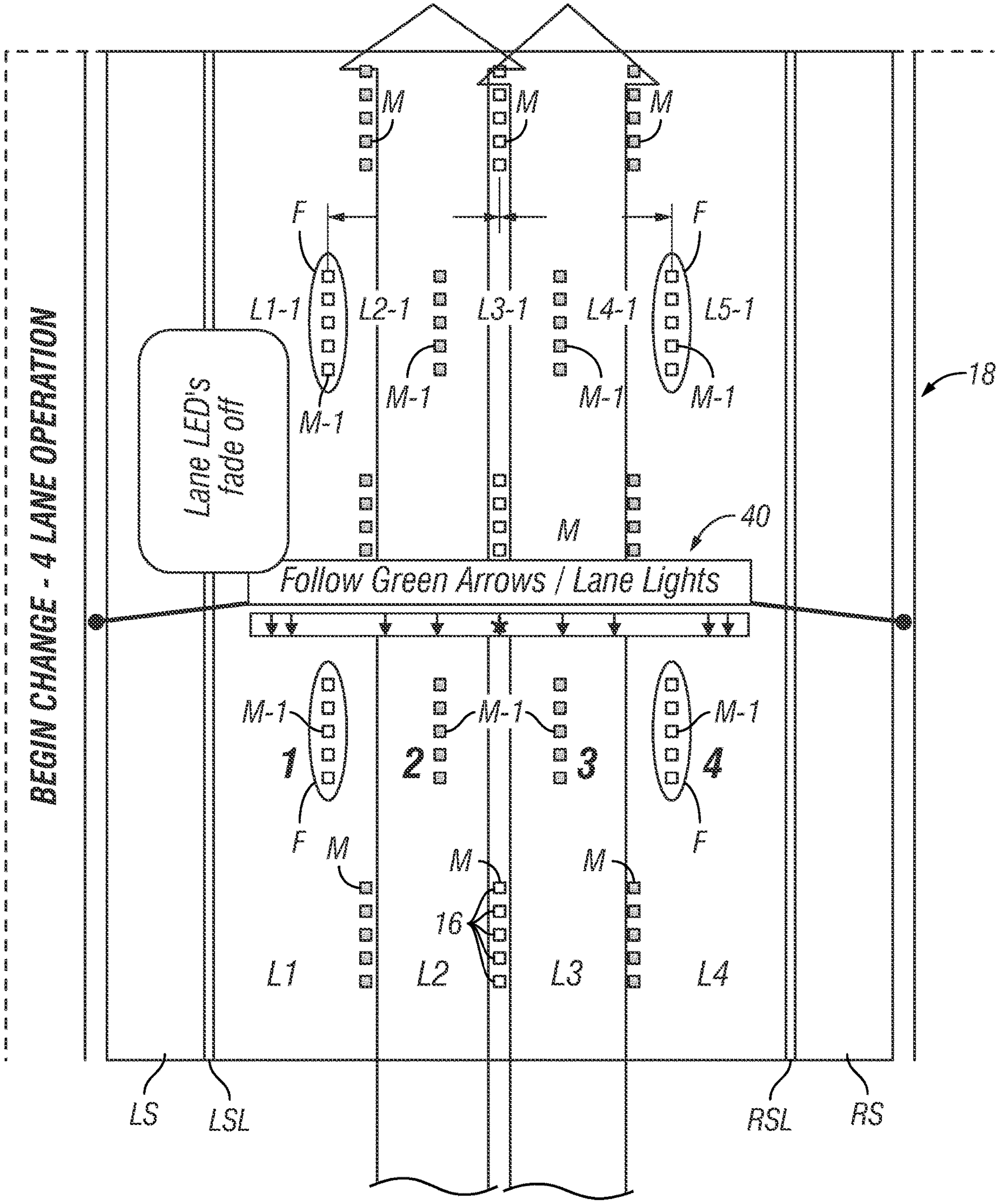

As shown in FIG. 26, as rush hour (the congestion situation) has almost ended, the controller 12 continues to control more of the lane markers M to become active, while the controller 12 controls continue to control more of the lane markers M-1, such as those indicated by F, to fade and become deactivated. The controller 12 further controls the overhead gantries 40 and any other suitable dynamic message signs (DMS) to indicate that the four lanes L1 through L4 are open, and as now indicated the positions of the green arrows have changed to be more aligned with the four lane L1 through L4 configuration. The controller 12 further controls the overhead gantries 40 to display additional information as indicated, such as "follow green arrows/lane lights" as well as speed information and any other suitable information as discussed herein and as would be appreciated by one skilled in the art. This information can also be provided to the vehicles 32 and the drivers as discussed above. Thus, the vehicles 32 should continue to reposition themselves to follow the green arrows.

Figure 27:
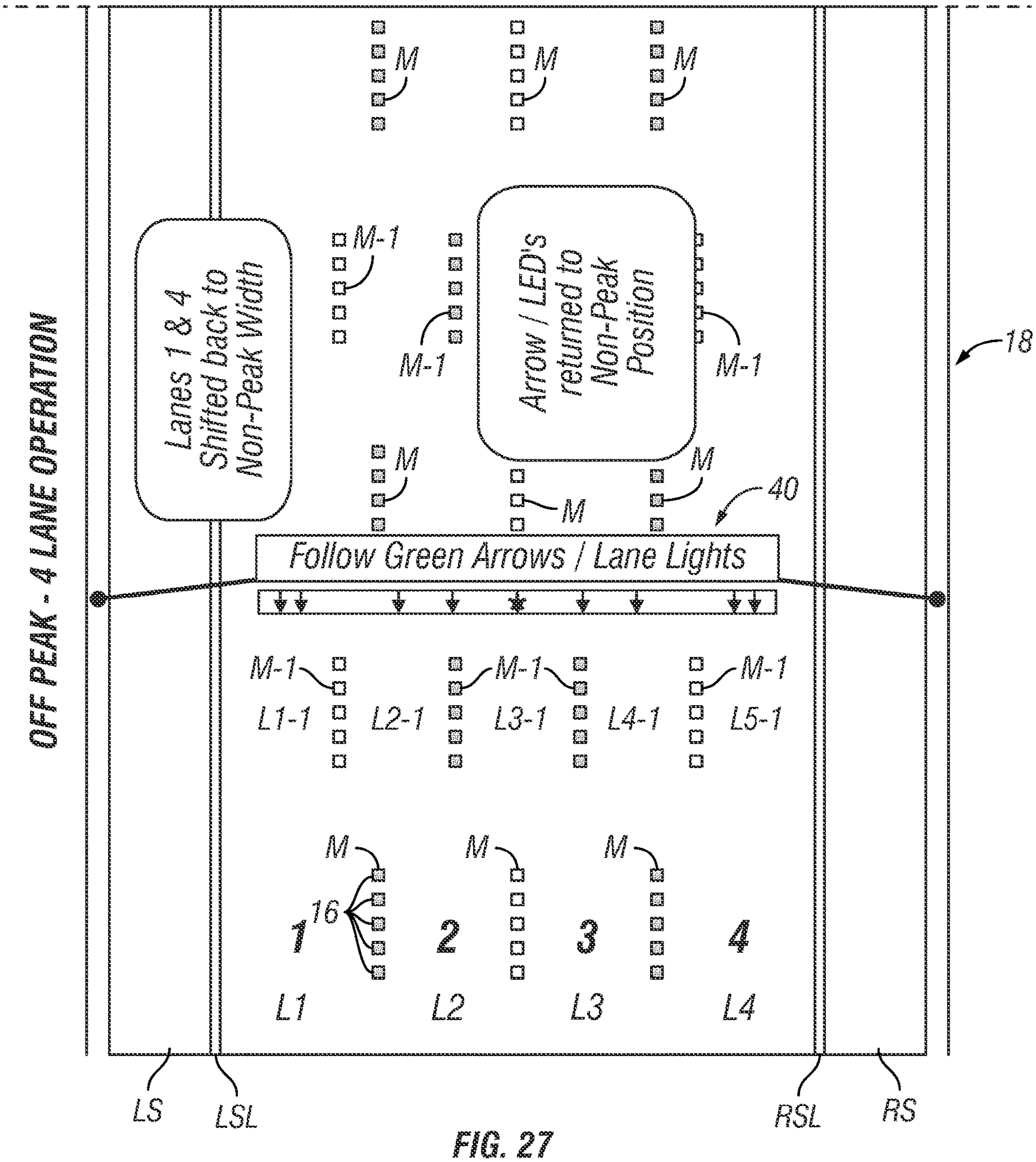

As shown in FIG. 27, as rush hour (the congestion situation) ends, the controller 12 continues to control the lane markers M to be active, while the controller 12 controls the lane markers M-1 to be deactivated. The controller 12 further controls the overhead gantries 40 and any other suitable dynamic message signs (DMS) to indicate that the four lanes L1 through L4 are open, and as now indicated the positions of the green arrows have changed to be more aligned with the four lane L1 through L4 configuration. The controller 12 further controls the overhead gantries 40 to display additional information as indicated, such as "follow green arrows/lane lights" as well as speed information and any other suitable information as discussed herein and as would be appreciated by one skilled in the art. This information can also be provided to the vehicles 32 and the drivers as discussed above. Thus, the vehicles 32 should continue to follow the green arrows. The main portion of the road segment 18 has now returned to the operation as shown, for example, in FIG. 11, and can resume the pre-rush hour configuration as shown in FIG. 10.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A system for integrating traffic flow of driverless vehicles and standard operational vehicles to manage traffic capacity on a road segment, the system comprising:

a dynamic lane marking configuration comprising transmitters; and a controller configured to control the dynamic lane marking configuration to control the transmitters to transmit information representing a lane configuration on the road segment for use by the driverless vehicles.

2. The system according to claim 1, wherein the controller is configured to control the dynamic lane marking configuration to switch between representing the lane configuration as including a first number of lanes, each having a first respective lane width, and a second number of lanes, each having a second respective lane width that is less than the first respective lane width, the second number of lanes being greater than the first number of lanes.

3. The system according to claim 2, wherein the controller configured to determine whether a condition pertaining to the road segment exists, and in response to existence of the condition, control the dynamic lane marking configuration to switch between representing the lane configuration as including the first number of lanes and representing the lane configuration as including the second number of lanes.

4. The system according to claim 3, wherein
the condition represents a traffic condition relating to vehicle congestion in the road segment.

5. The system according to claim 3, further comprising:
a monitoring system configured to determine whether the condition pertaining to the road segment exists.

6. The system according to claim 3, wherein:
the controller is configured to at least one of the lanes as a fare lane requirement payment for usage.

7. The system according to claim 3, wherein:
the condition represents an emergency condition and one of the driverless vehicles or one of the standard operational vehicles is a vehicle responding to the emergency condition.

8. The system according to claim 3, wherein:
the condition represents a weather condition.

9. The system according to claim 3, wherein:
the condition represents a closure, obstruction or incident pertaining to the road segment.

* * * * *